(12) United States Patent
Yazaki et al.

(10) Patent No.: US 7,697,517 B2
(45) Date of Patent: Apr. 13, 2010

(54) PACKET FORWARDING APPARATUS WITH TRANSMISSION CONTROL FUNCTION

(75) Inventors: Takeki Yazaki, Hachloji (JP); Takeshi Aimoto, Kawasaki (JP)

(73) Assignee: Alaxala Networks Corporation, Kanagawa (JP)

( * ) Notice: Subject to any disclaimer, the term of this patent is extended or adjusted under 35 U.S.C. 154(b) by 886 days.

(21) Appl. No.: 11/480,973

(22) Filed: Jul. 6, 2006

(65) Prior Publication Data
US 2007/0177599 A1    Aug. 2, 2007

(30) Foreign Application Priority Data
Jan. 30, 2006  (JP)  .............. 2006-019977

(51) Int. Cl.
*H04L 12/56* (2006.01)
(52) U.S. Cl. .................. 370/389; 370/390; 370/392
(58) Field of Classification Search .............. None
See application file for complete search history.

(56) References Cited

U.S. PATENT DOCUMENTS

| 5,648,957 | A * | 7/1997 | Lee et al. ............... 370/355 |
| 6,831,898 | B1 * | 12/2004 | Edsall et al. ............ 370/256 |
| 6,976,088 | B1 * | 12/2005 | Gai et al. ................ 709/238 |
| 2003/0118016 | A1 * | 6/2003 | Kalkunte et al. ........... 370/389 |
| 2003/0142696 | A1 * | 7/2003 | Holmeide et al. .......... 370/508 |
| 2005/0141496 | A1 * | 6/2005 | Navada et al. ............ 370/389 |
| 2005/0259578 | A1 * | 11/2005 | Shinagawa et al. ......... 370/230 |
| 2006/0092826 | A1 * | 5/2006 | Karam et al. ............. 370/216 |
| 2007/0177599 | A1 * | 8/2007 | Yazaki et al. ............. 370/392 |

FOREIGN PATENT DOCUMENTS

JP    06-315034    11/1994

OTHER PUBLICATIONS

"A Self-Clocked Fair Queueing Scheme for Broadbanc Applications" by S. Golestani, et al. 1994, pp. 636-646.
"Link Aggregation according to IEEE 802.3ad", White Paper, SysKonnect, 2002.
"Fast Reroute Extensions to RSVP-TE for LSP Tunnels" by P. Pan, et al. May 2005, RFC:4090.

* cited by examiner

*Primary Examiner*—Jayanti K Patel
*Assistant Examiner*—Anthony Sol
(74) *Attorney, Agent, or Firm*—Mattingly & Malur, P.C.

(57) ABSTRACT

A packet forwarding apparatus 200 transmits an inputted packet A to a first output port that is one of a plurality of output ports and transmits a dummy packet A storing the packet length of packet A to the other output port. A shaping unit 100-1 corresponding to the first output port uses the packet length of the packet A and a shaping unit 100-2 corresponding to the port other than the first output port uses a packet length in the dummy packet A so as to control the bandwidth of the packet A to be transmitted, thus controlling the total bandwidth of the packet A.

5 Claims, 18 Drawing Sheets

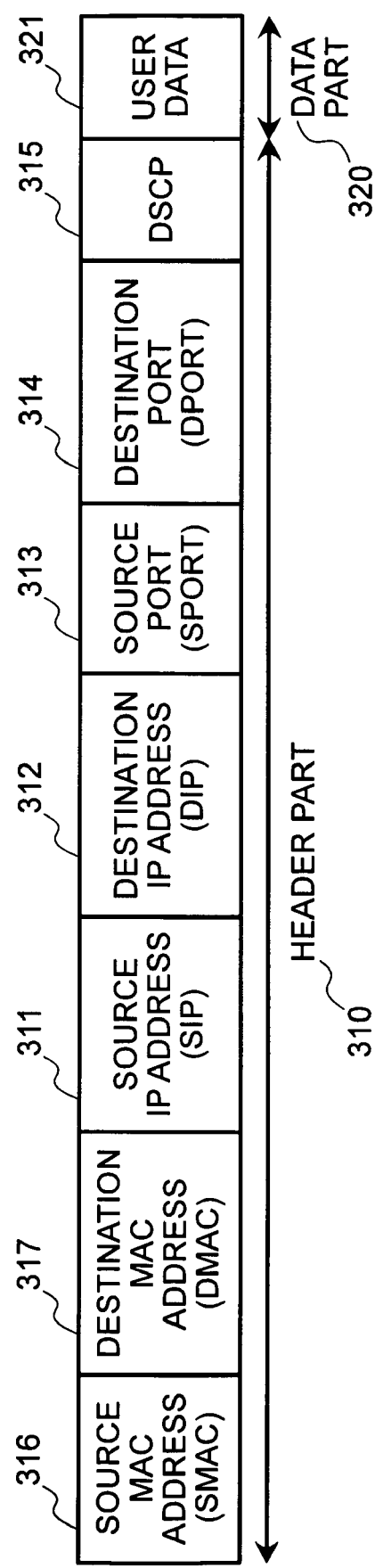

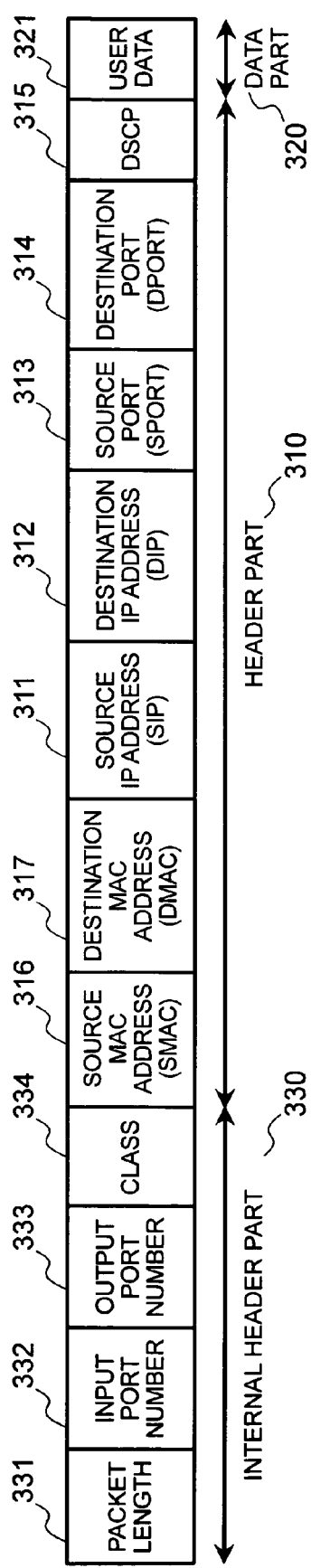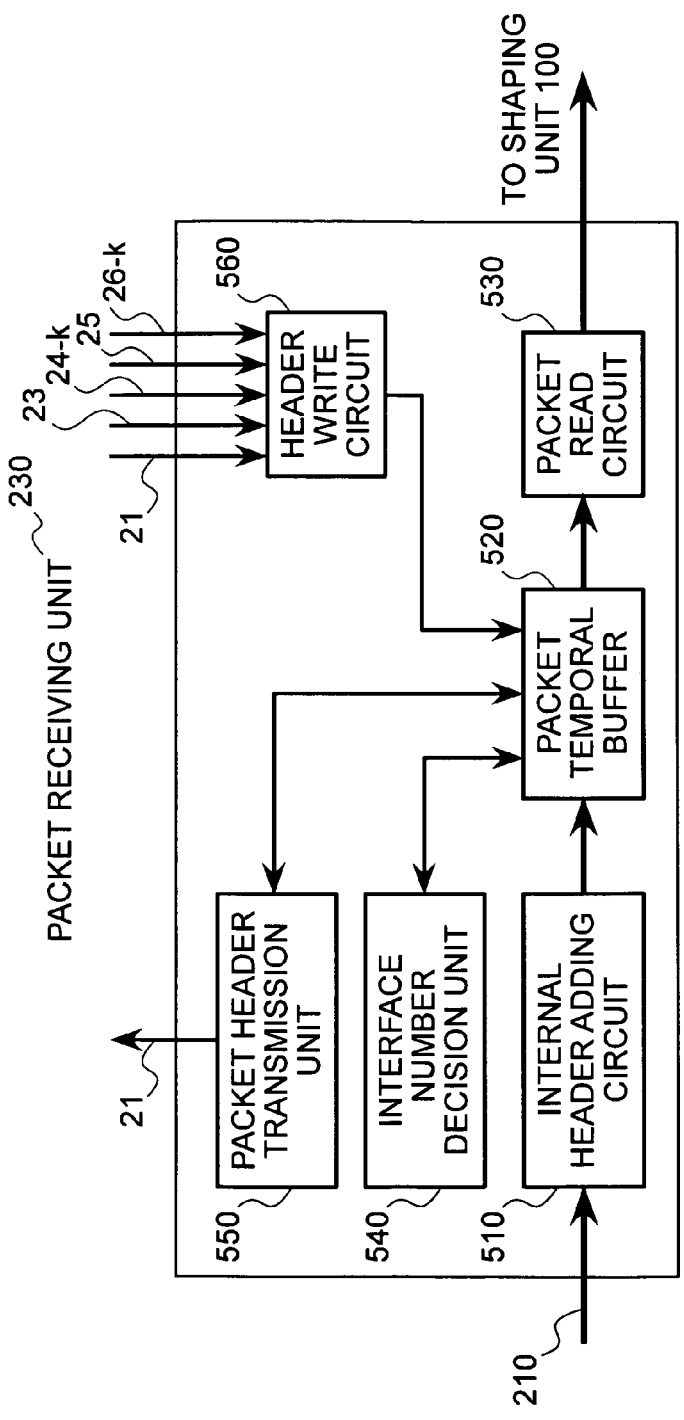

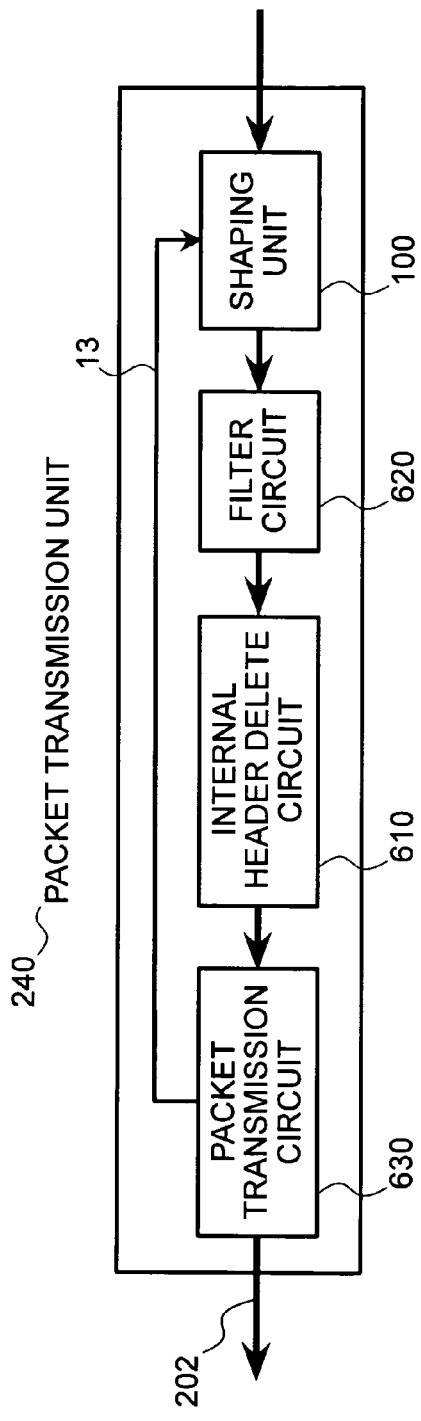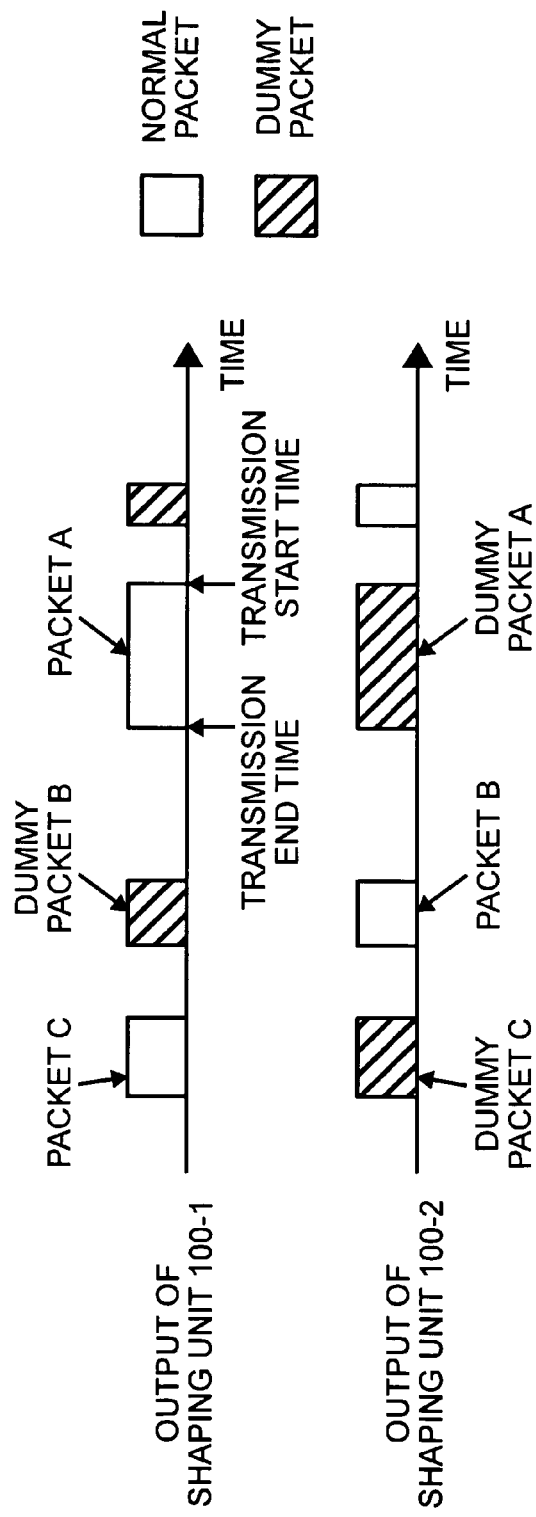

OUTPUT PORT NUMBER TABLE ~820

| OUTPUT PORT GROUP NUMBER | | | | |
|---|---|---|---|---|
| 1 | 1 | 2 | * | * |
| 2 | 3 | * | * | * |
| 3 | 4 | 5 | * | * |
| 4 | * | * | * | * |

910-1, 910-2, 910-3, 910-4

OUTPUT PORT/OUTPUT LABEL NUMBER TABLE ~1920

| OUTPUT PORT GROUP NUMBER | OUTPUT PORT NUMBER 1 | OUTPUT LABEL NUMBER 1 | OUTPUT PORT NUMBER 2 | OUTPUT LABEL NUMBER 2 | OUTPUT PORT NUMBER 3 | OUTPUT LABEL NUMBER 3 | OUTPUT PORT NUMBER 4 | OUTPUT LABEL NUMBER 4 |
|---|---|---|---|---|---|---|---|---|
| 1 | 1 | 11 | 1 | 12 | * | * | * | * |
| 2 | 3 | 13 | * | * | * | * | * | * |
| 3 | 4 | 14 | 5 | 15 | * | * | * | * |
| 4 | * | * | * | * | * | * | * | * |

1910-1, 1910-2, 1910-3, 1910-4

BANDWIDTH INFORMATION STORING UNIT ~1140

CLASS   MINIMUM BANDWIDTH 1   40Mbps   1341-1
2   120Mbps  1341-2

PACKET FORWARDING APPARATUS WITH TRANSMISSION CONTROL FUNCTION

BACKGROUND OF THE INVENTION

1. Field of the Invention

The present invention relates to a packet forwarding apparatus for controlling the bandwidth of a packet flowing on a network for example, and a method thereof.

2. Description of the Related Art

In a packet type communication system employed in an IP network, a large number of users can share the same line, thereby making it possible to reduce the cost per bandwidth. Due to the low cost of the packet type communication system, there are moves to achieve telecommunication networks and business networks of enterprises with IP networks in place of private networks which have heretofore been used. It is required for IP networks to ensure quality of service (QoS) for voice data and mission critical data that have been achieved through private networks and achieve high availability.

In order to ensure the QoS, it is necessary that a packet forwarding apparatus constituting an IP network has a QoS control mechanism for ensuring QoS for voice data and mission critical data. As a QoS control mechanism, there is known a shaping function for example. Japanese Patent Application Laid-Open No. 6-315034 (document 1) describes a shaping apparatus for carrying out the shaping function. The shaping apparatus described in document 1 includes a queue for storing a cell of a fixed-length packet for each virtual connection (VC) and transmits a packet from the queue with a predetermined bandwidth for each VC to ensure a bandwidth for each VC. For example, an administrator of an IP network disposes this shaping apparatus at a port where traffic concentrates and assigns VC to voice data and mission critical data, thereby making it possible to ensure QoS for the data.

As another shaping apparatus, there is known Weighted Fair Queuing (WFQ). A shaping apparatus of WFQ based on an algorithm called Self Clocked Fair Queuing (SCFQ) is described in document 2 (S. Golestani, "Self-Clocked Fair Queuing Scheme for Broadband Applications", In proc. of INFORCOM' 94, pp. 636-646, 1994.). The shaping apparatus described in document 2 manages a plurality of k's (where k=1 to N) and has weight Wk for each session k. When a packet $p\_k\_i$ arrives at the shaping apparatus, the shaping apparatus stores the packet $p\_k\_i$ into a queue and calculates variable $F\_k\_i$ for each packet $p\_k\_i$ according to the following equation.

$$F\_k\_i = L\_k\_i/Wk + \max(F\_(k-1)\_i, V(ta\_k\_i))$$

where, L is a packet length of packet $p\_k\_i$, $ta\_k\_i$ is an arrival time of packet $p\_k\_i$, and $V(t)$ is a function that returns a value of $F\_k\_i$ of a packet outputted at time t. For the output of a packet, packet $p\_k\_i$ having the minimum $F\_k\_i$ is outputted, thereby implementing packet output in proportion to weight Wk of each session. For example, the administrator of the IP network assigns one session k to voice data and mission critical data to ensure the bandwidth for Wi/(total sum of Wk)×port bandwidth, thereby making it possible to ensure QoS for the data.

On the other hand, a link aggregation technology for achieving high availability of a packet forwarding apparatus is described in document 3 (Link Aggregation according to IEEE standard 802.3ad (http://www.triumf.ca/canarie/amsterdam-test/References/wp-lag-e.pdf)). According to the link aggregation technology, a plurality of physical ports (physical links) are treated as one logical link aggregation group which can be treated as in the case of one physical port. Even if one physical port of the link aggregation group fails, at least one physical port functions normally; therefore, there is no break in communication between packet forwarding apparatuses connected through the link aggregation group. Accordingly, the administrator of the IP network connects between packet forwarding apparatuses using a plurality of ports to which link aggregation is applied instead of a single port, thus making it possible to enhance network availability.

Further, a fast reroute technology for achieving high availability in a multi protocol label switching (MPLS) network in which a label switching path (LSP) is set is described in document 4 (IETF Internet Draft draft-ietf-mpls-rsvp-lsp-fastreroute-07.txt "Fast Reroute Extensions to RSVP-TE for LSP Tunnels"). This document describes a one-to-one backup method for protecting traffic flowing along an LSP and a facility backup method. According to the document, the one-to-one backup method sets one backup LSP corresponding to a protected LSP, and the facility backup method sets one backup LSP corresponding to a plurality of protected LSPs. When a failure occurs on a protected LSP, traffic flowing along the LSP is detoured along the backup LSP. The administrator of the IP network sets up a backup LSP for a protected LSP to implement the detour, thereby greatly enhancing network availability.

SUMMARY OF THE INVENTION

The shaping apparatuses described in documents 1 and 2 are based on the precondition of packet output to a single output port, but not to a plurality of ports. For this reason, the shaping apparatus of document 1 or 2 cannot control the total bandwidth of packets outputted to a plurality of physical ports where the link aggregation technology is applied. Therefore, there is a problem that QoS for voice data and mission critical data is not ensured in an IP network composed of packet forwarding apparatuses to which the link aggregation technology is applied.

Further, in a network where the fast reroute technology described in document 4 is applied, there may be cases where the packet forwarding apparatus transmits packets distributed to protected LSPs and backup LSPs set to different output ports. Since the shaping apparatus of document 1 or 2 does not support packet output to a plurality of ports, it cannot control the total bandwidth of packets of the protected LSPs and the corresponding backup LSPs. Therefore, there is a problem that QoS for voice data and mission critical data is not ensured in an IP network composed of packet forwarding apparatuses to which the fast reroute technology is applied.

It is desirable that respective shaping units corresponding to output ports constituting an output port group such as protected LSPs and backup LSPs be mounted on separate printed circuit boards for the purpose of making provision for a failure. In the case where the shaping units are simply mounted on separate printed circuit boards and transfer information between themselves, there is a problem that delay time of information transfer increases so that it becomes difficult for the shaping units to perform high-speed bandwidth control.

In order to address the above-described problems, according to one aspect of the present invention, there is provided a packet forwarding apparatus for determining a plurality of input ports, a plurality of output ports, and an output port group composed of at least one output port from information in a header of a packet and transmitting a packet from either of a first output port and a second output port included in the output port group. The packet forwarding apparatus includes a transmission control unit for controlling a bandwidth of the second output port included in the output port group, using a packet length of a first packet that is transmitted from the first output port included in the output port group.

These and other objects, features and advantages of the invention will be apparent from the following more particular description of preferred embodiments of the invention, as illustrated in the accompanying drawings.

BRIEF DESCRIPTION OF THE DRAWINGS

In the accompanying drawings,

FIG. 3 is an illustration showing an example of the format of a packet transmitted and received by the packet forwarding apparatus 200;

FIG. 4 is an illustration showing an example of the format of a packet in the packet forwarding apparatus 200;

FIG. 5 is a block diagram of a packet receiving unit 230;

FIG. 8 is a block diagram of a packet transmission unit 240;

FIG. 9 is an illustration showing times when shaping units 100-1 and 100-2 transmit packets;

DETAILED DESCRIPTION OF THE INVENTION

Hereinafter, a preferred embodiment of the present invention will be described with reference to FIGS. 1 to 24. However, the invention is not limited thereto. In this embodiment, the term "protected port" refers to an output port for accommodating a protected LSP of MPLS, and the term "backup port" refers to an output port for accommodating a backup LSP corresponding to the protected LSP. Further, the term "link aggregation group" refers to a set of a plurality of output ports aggregated by link aggregation, the term "protected/backup port" refers to a set of a protected port and a corresponding backup port, and the term "output port group" refers to the entire set of a link aggregation group and a protected/backup port.

(1) General Operation of a Router

Figure 2:
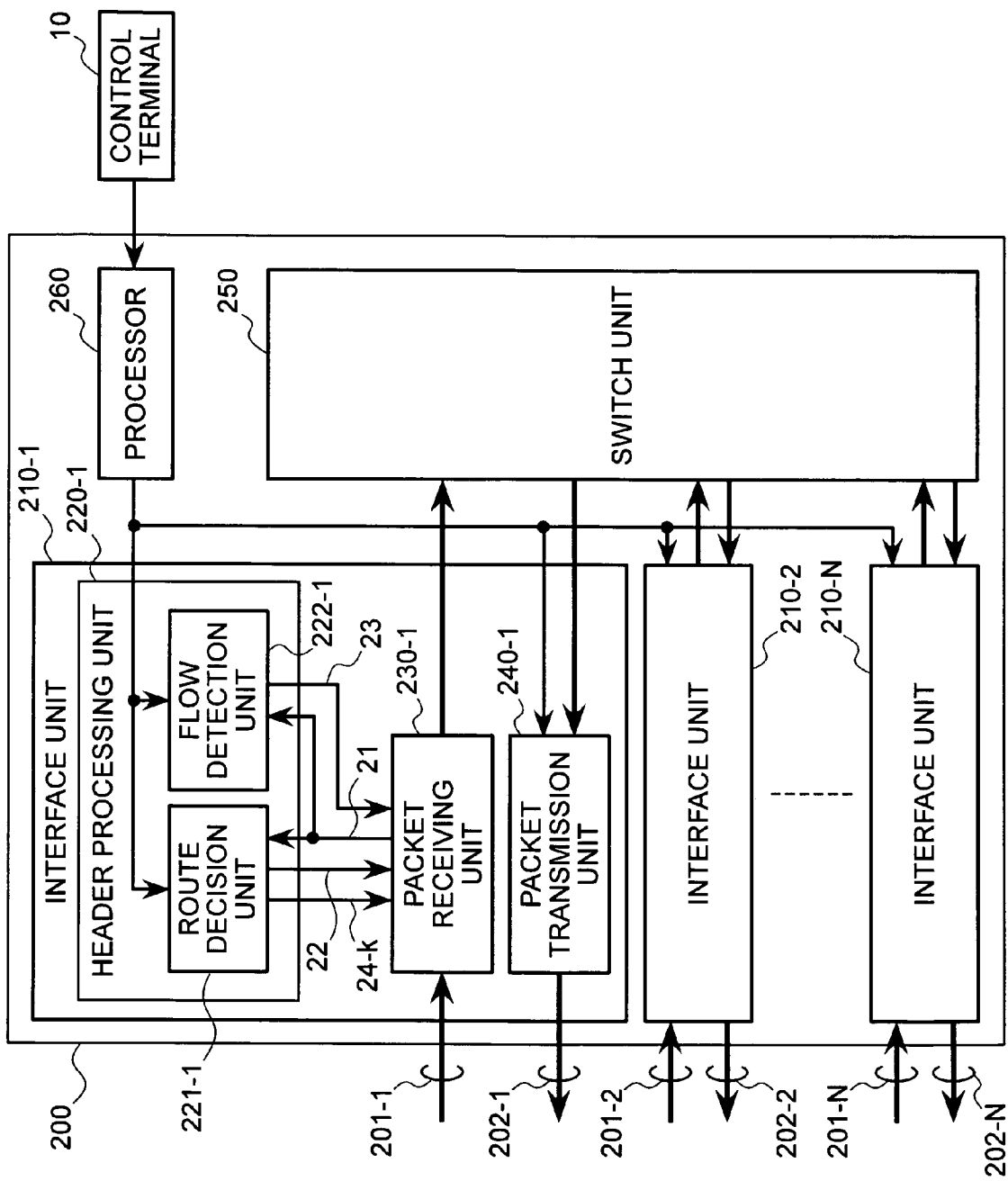
FIG. 2 is a block diagram of a packet forwarding apparatus 200.

The general operation of a router having a shaping function according to this embodiment will be described below with reference to FIG. 2. FIG. 2 shows a packet forwarding apparatus 200 according to this embodiment. The packet forwarding apparatus 200 is composed of N input ports 201-$i$ (where i=1 to N) for packet input, N output ports 202-$i$ (where i=1 to N), N interface units 210-$i$ (where i=1 to N), a switch unit 250 for connecting interface units 210-$i$, and a processor 260. An interface unit 210-$i$ is composed of a packet receiving unit 230-$i$ for performing reception processing of a packet received from an input port 201-$i$, a packet transmission unit 240-$i$ for performing transmission processing of a packet to be transmitted to an output port 202-$i$, and a header processing unit 220-$i$. A header processing unit 220 is composed of a route decision unit 221 which, based on header information etc. of a packet inputted through an input port 201, determines the number j of an output port 202-$j$ for outputting the packet and an MPLS label of the packet; and a flow detection unit 222 which determines the class of communication quality (hereinafter simply referred to as a "class") of an inputted packet, based on header information etc. The class indicates the type of a packet (e.g., voice=VoIP, video, etc.) and priority.

FIG. 3 shows an example of the format of a packet that is inputted through an input port 201-$i$. This format is composed of a header part 310 and a data part 320. The header part 310 is composed of a source MAC address (hereinafter referred to as "SMAC") 316 which is the source address of a data link layer, a destination MAC address (hereinafter referred to as "DMAC") 317 which is a destination address, a source IP address (hereinafter referred to as "SIP") 311 which is the source address of a network layer (address of a transmitting terminal), a destination IP address (hereinafter referred to as "DIP") 312 which is a destination address (address of a receiving terminal), a source port (hereinafter referred to as "SPORT") 313 indicative of a protocol (=upper application), a destination port (hereinafter referred to as "DPORT") 314, and a DSCP 315 indicative of transfer priority within a network. The data part 320 is composed of user data 321.

FIG. 4 is an example of the format of a packet in the packet forwarding apparatus 200. This format has an internal header part 330 added to the format of FIG. 3. The internal header part 330 is composed of a packet length 331 indicative of the length of an inputted packet, an input port number 332 which is the number of the port through which the packet is inputted, an output port number 333 which is the number of the output port through which the packet is outputted, and a class 334 of the packet. Further, in addition to a packet of the format shown in FIG. 4, a dummy packet composed of the internal header part 330 is also used in the packet forwarding apparatus 200. Ad description will be made later on how to use the dummy packet.

A description will be made of a flow in which a packet is inputted from the input port 201 and outputted to the output port 202 with reference to FIG. 2. When a packet is inputted from the input port 201, an internal header adding circuit 510 in a packet receiving unit 230 shown in FIG. 5 adds an internal header part 330 to the packet. Further, the internal header adding circuit 510 counts a byte length of the packet, writes the byte length into the packet length 331, and writes the number of the input port 201 to which the packet is inputted, into the input port number 332. Then, the internal header adding circuit 510 stores the packet in a packet temporal buffer 520.

Further, a packet header transmission unit 550 transmits the header part 310 and the internal header part 330 of the packet in the packet temporal buffer 520 as packet header information 21 to the route decision unit 221 and the flow detection unit 222 in the header processing unit 220 which are specific to the packet forwarding apparatus 200. At this time, the output port number 333 and the class 334 contains meaningless values.

The route decision unit 221 determines the number of one output port (hereinafter referred to as an output port number) and a dummy packet output port number k (where k is a positive integer not greater than n) which indicates each of the output port numbers of n dummy packets, based on the DIP 312 or the DMAC 317 of the received packet header information 21. The symbol n is equal to or greater than 1 in the case where the output port of a packet belongs to an output port group including a link aggregation group and a fast-reroute protected/backup port. Further, the route decision unit 221 transmits the output port number as packet output port information 22 to the packet receiving unit 230. In the case where n is equal to or greater than 1, the route decision unit 221 transmits the dummy packet output port number k as dummy packet output port information 24-k to the packet receiving unit 230 in order of increasing k.

On the other hand, the flow detection unit 222 in the header processing unit 220 determines the class of the packet and transmits it as packet class information 23 to the packet receiving unit 230.

A header write circuit 560 in the packet receiving unit 230 writes the values of the packet output port information 22 and the packet class information 23 into the respective fields of the output port number 333 and the class 334 of the packet stored in the packet temporal buffer 520. A packet read circuit 530 reads the packet from the packet temporal buffer 520 and transmits it to the switch unit 250. Further, each time the header write circuit 560 receives dummy packet output port information 24-k, the header write circuit 560 updates the output port number 333 of the packet stored in the packet temporal buffer 520 to the value of the dummy packet output port information 24-k, and the packet read circuit 530 transmits the internal header part 330 as a dummy packet k (where k is a positive integer not greater than n) to the switch unit 250. Each time dummy packet output port information 24-k is received, a dummy packet is transmitted; therefore, n dummy packets are transmitted to the switch unit 250.

The reason why a dummy packet is composed of only the internal header part 330 is to reduce loads on the switch unit 250 and the packet transmission unit 240. If the packet transmission unit 240 needs to refer to the header part 310 and the data part 320, these pieces of information may be added to the dummy packet.

Figure 6:
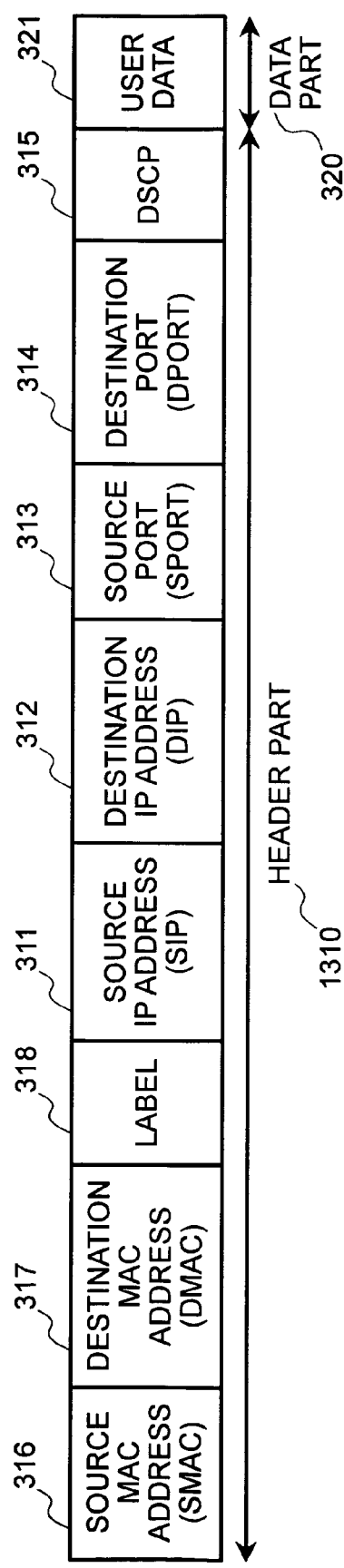
FIG. 6 is an illustration showing an example of the format of an MPLS packet transmitted and received by the packet forwarding apparatus 200.
Figure 7:
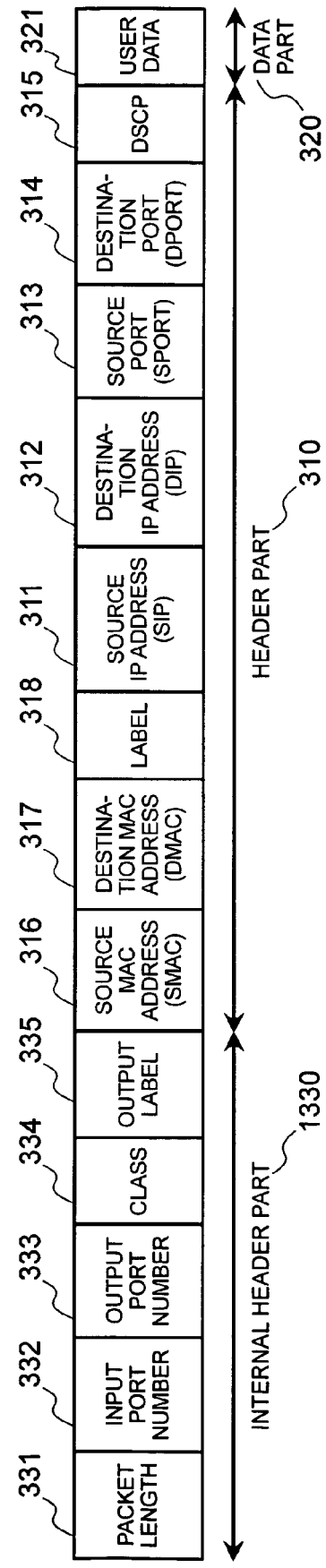
FIG. 7 is an illustration showing an example of the format of an MPLS packet in the packet forwarding apparatus 200.

FIGS. 6 and 7 show a format of a packet in an MPLS network (hereinafter referred to as an MPLS packet) and a format of the packet in the packet forwarding apparatus 200, respectively. The format of FIG. 6 has a label 318 added to the format of FIG. 3, and the format of FIG. 7 has an output label 335 added to the format of FIG. 4. Further, a dummy packet in the packet forwarding apparatus 200 set up in the MPLS network is composed of an internal header part 1330 of FIG. 7.

The route decision unit 221 in the packet forwarding apparatus 200 in the MPLS network determines an output port number, a dummy packet output port number k (where k is a positive integer not greater than n), an output label value indicative of an LSP for packet transfer, and an dummy output label value k (where k is a positive integer not greater than n) indicative of an LSP for a dummy packet, based on the label 318 of the received packet header information 21. Further, the route decision unit 221 transmits the output port number as packet output port information 22 and the output label value as packet output label information 25 to the packet receiving unit 230. Furthermore, in the case where n is equal to or greater than 1, the route decision unit 221 transmits the dummy packet output port number k and the dummy output label value k as dummy packet output information 26-k to the packet receiving unit 230 in order of increasing k. In FIG. 2, label information 25 and 26-k are omitted for the sake of simplicity.

Upon receiving the values of the packet output port information 22, the packet class information 23, and the packet output label information 25, the header write circuit 560 in the packet receiving unit 230 writes these values into the respective fields of the output port number 333, the class 334, and the output label 335. The packet read circuit 530 reads the packet from the packet temporal buffer 520 and transmits it to the switch unit 250. Further, each time the header write circuit 560 receives dummy packet output information 26-k, the header write circuit 560 updates the output port number 333 and the output label 335 to the values in the information 26-k, and the packet read circuit 530 transmits the internal header part 1330 as a dummy packet k to the switch unit 250. Each time dummy packet output information 26-k is received, a dummy packet is transmitted; therefore, n dummy packets are transmitted to the switch unit 250.

The switch unit 250 that has received a normal packet or a dummy packet transmits the packet or the dummy packet to the packet transmission unit 240 in the interface unit 210 corresponding to the output port number 333.

FIG. 8 shows the details of the packet transmission unit 240. The packet transmission unit 240 is composed of a shaping unit 100, a filter circuit 620, an internal header delete circuit 610, and a packet transmission circuit 630. The shaping unit 100 controls the bandwidth of a dummy packet and a normal packet for the corresponding output port 202, on the assumption that the packet length of the dummy packet is the packet length 331 in the packet. The bandwidth of a dummy packet and a normal packet is controlled so as to be the total bandwidth of packets to be transmitted to the output ports 202 constituting an output port group such as a link aggregation group and a protected/backup port. For example, in the case of limiting the total bandwidth of packets transmitted to a link aggregation group and a protected/backup port to a maximum bandwidth of A Mbps, the shaping unit 100 limits the total bandwidth of a dummy packet and a normal packet to A Mbps. However, in practice, the packet length of a dummy packet is shorter than the packet length 331 in the packet; therefore, an actual bandwidth is less than A Mbps.

Further, a shaping unit 100 corresponding to another output port 202 controls the total bandwidth of a dummy packet and a normal packet in the same manner as in the above-described shaping unit 100. In the case of limiting the above-described total bandwidth to a maximum bandwidth of A Mbps, the shaping unit 100 limits the total bandwidth of a dummy packet and a normal packet to A Mbps.

On the other hand, the filter circuit 620 that has received these packets transmits only the normal packet to the internal header delete circuit 610 and discards the dummy packet. The internal header delete circuit 610 deletes the internal header part 330 and transmits the packet to the packet transmission circuit 630. The packet transmission circuit 630 transmits the received packet to the output port 202.

At this time, the dummy packet discarded by the filter circuit 620 is transmitted to another output port constituting the output port group from another filter circuit 620. Therefore, the total bandwidth of packets finally transmitted to the output port group becomes equal to the total bandwidth of a dummy packet and a normal packet transmitted by one shaping unit 100. In the case of limiting the above-described total bandwidth to a maximum bandwidth of A Mbps, the shaping unit 100 implements packet transmission for limiting the total bandwidth for the output ports 202 constituting the output port group to a maximum bandwidth of A Mbps. Specific examples will be described below.

SPECIFIC EXAMPLE 1

Assume that a link aggregation group is composed of output ports 202-1 and 202-2 and the total bandwidth of the link aggregation group is limited to a maximum bandwidth of 10 Mbps. In this case, the shaping unit 100-1 controls the bandwidth of an output packet and a dummy packet to 10 Mbps at the maximum, on the assumption that the packet length of the dummy packet is the value of the packet length 331 in the packet. The same applies to the shaping unit 100-2. FIG. 9 shows times when the shaping units 100-1 and 100-2 output packets. Normal packets are indicated in white, and dummy packets which the filter circuit 620 discards are indicated by oblique lines. The bandwidth of a packet and a dummy packet that each shaping unit 100 outputs is 10 Mbps at the maximum. While the bandwidth of a normal packet and a dummy packet that the shaping units 100-1 and 100-2 transmit comes to 20 Mbps at the maximum, the bandwidth of the finally transmitted packet comes to 10 Mbps or less because the dummy packet is discarded by the filter circuit 620-1. The detailed operation of the shaping unit 100 will be described later.

In the case of guaranteeing that the total bandwidth for the link aggregation group is 10 Mbps at the minimum in transmission by the shaping units 100-1 and 100-2, the shaping units 100-1 and 100-2 only control the respective total bandwidths of a packet and a dummy packet to 10 Mbps at the minimum, on the assumption that the packet length of the dummy packet is the packet length 331. At this time, since the dummy packet discarded by the filter circuit 620-1 is transmitted by a filter circuit 620-2 of the output port that pairs up with the output port 202-1, the bandwidth of the packets finally transmitted to the link aggregation group comes to 10 Mbps at the minimum.

SPECIFIC EXAMPLE 2

Assume that a link aggregation group composed of output ports 202-1 and 202-2 has classes 1 and 2 whose bandwidths are limited to 20 Mbps and 80 Mbps at the maximum, respectively. In this case, the shaping units 100-1 and 100-2 limit the bandwidth of a packet and a dummy packet of class 1 to 20 Mbps and that of class 20 to 80 Mbps, on the assumption that the packet length of the dummy packet is the packet length 331.

As in the case of example 1, the bandwidth of a normal packet and a dummy packet of class 1 transmitted by the shaping units 100-1 and 100-2 is 40 Mbps at the maximum and that of class 2 is 160 Mbps. Since the dummy packets are discarded by the filter circuit 620-1, the bandwidths of the finally transmitted packets are equal to or less than 20 Mbps and 80 Mbps, respectively.

While the description has been made of the case where the number of output ports constituting the output port group is two, the same applies in the case where the number of output ports is three or more. That is, assuming that the number of output ports 202 constituting an output port group is m, the bandwidth of packets transmitted by all shaping units 100 comes to a maximum bandwidth times m, at the maximum. However, the dummy packets corresponding to one packet that are sent to m−1 ports are all discarded by the filter circuits 620; therefore, the bandwidth of the finally transmitted packet comes to the maximum bandwidth or less.

In the case of guaranteeing the minimum bandwidths for classes 1 and 2 in transmission by the shaping units 100-1 and 100-2, the shaping units 100 only transmit packets and dummy packets in such a manner as to guarantee the minimum bandwidths. At this time, since the dummy packets discarded by the filter circuit 620-1 are transmitted by the filter circuit 620-2 of the other output port constituting the output port group, the minimum bandwidth of the packets transmitted to the output ports 202 constituting the output port group is guaranteed.

The shaping units 100-1 and 100-2 may perform bandwidth control other than the maximum bandwidth limitation and the minimum bandwidth guarantee described above. For example, it can include WFQ for allocating bandwidths to class 1 and class 2 based on a set ratio of class 1 to class 2. In this case, the shaping units 100 transmit packets and dummy packets in such a manner as to satisfy the ratio of class 1 to class 2.

The description has been made of the example in which the packet length of a packet is notified to the interface unit 210 of the output port constituting the output port group by the packet and the dummy packet. However, it is not necessary to use a dummy packet as long as the packet length of the packet can be notified to the interface unit 210.

(2) Detailed Operation of the Route Decision Unit

The detailed operation of the route decision unit 221 specific to the packet forwarding apparatus 200 will be described below with reference to FIG. 10.

Figure 10:
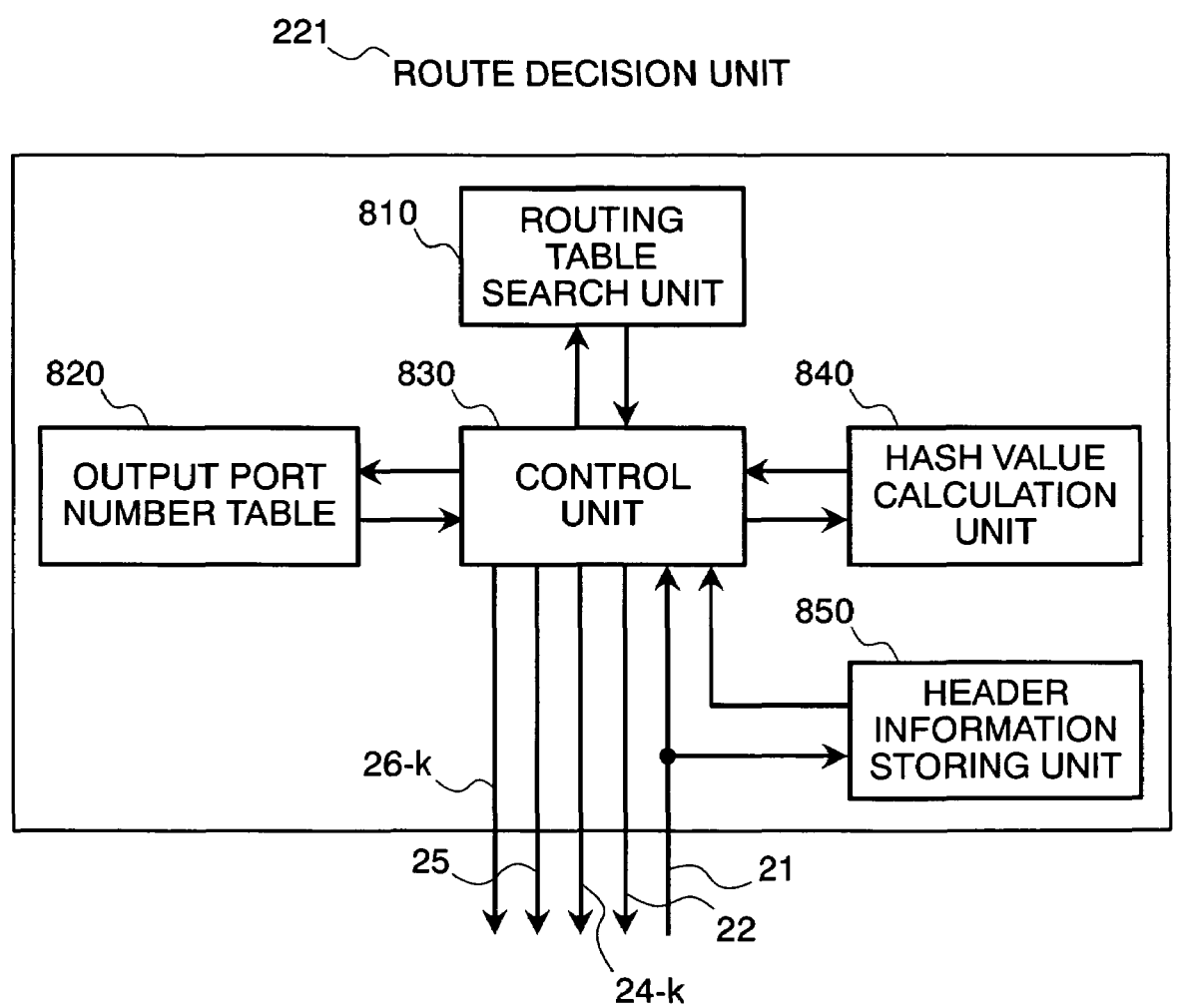
FIG. 10 is a block diagram of a route decision unit 221.

(2-1) In the Case of Controlling the Total Bandwidth of Packets Transmitted to a Link Aggregation Group First, when the route decision unit 221 shown in FIG. 10 receives the packet header information 21 from the packet receiving unit 230, a header information storing unit 850 stores the information. Then, a control unit 830 reads DMAC 317 or DIP 312 of the header part 310 stored in the header information storing unit 850 and transmits it to a routing table search unit 810. The routing table search unit 810 manages an association table of the number of the output port group (hereinafter referred to as an output port group number) and DMAC or the output port group number and DIP. When DMAC or DIP is inputted, the routing table search unit 810 outputs the corresponding output port group number to the control unit 830.

The control unit 830 determines one or more than one output port number candidate from the received output port group number. More than one output port number candidate exists in the case where the output port group is composed of multiple output ports 202. The control unit 830 determines one output port number for outputting a packet out of these candidates and transmits it as packet output port information 22 to the packet receiving unit 230. In the case where more than one output port number candidate exists, the control unit 830 determines that a value other than the output port number out of output port number candidate values is a dummy packet output port number k (k=1, 2, . . . , n) for transmitting a dummy packet, and transmits it as dummy packet output port information 24-$k$ (k=1, 2, . . . , n) to the packet receiving unit 230. For example, in the case where the link aggregation group is composed of three output ports 202, the control unit 830 transmits one packet output port information 22 and dummy packet output port information 24-1 and 24-2 to the packet receiving unit 230.

Figure 11:
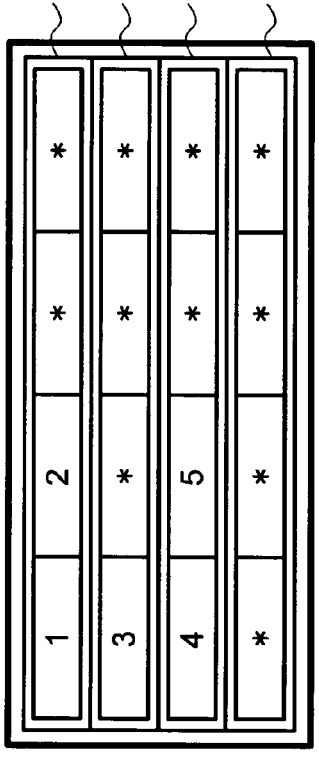
FIG. 11 is an illustration showing an example of the structure of an output port number table 820.

The control unit 830 refers to, for example, an output port number table 820 shown in FIG. 11 and thereby determines output port number candidates. The output port number table 820 contains an entry 910-$i$ (where i=1 to 4) including four output port numbers for each output port group. While this table shows an example in which the maximum number of output port groups is four and the maximum number of output ports of a link aggregation group is four, it is possible to easily increase these maximum values by increasing the number of entries 910 or the number of output port numbers in an entry 910-$i$.

In the case where an entry 910-$i$ stores output port numbers less than four, the entry 910-$i$ stores valid output port numbers in order from the left of the entry 910-$i$. In the output port number table 820 shown in FIG. 11, output port group 1 is composed of output ports 202-1 and 202-2, output port group 2 is composed of an output port 202-3, and output port group 3 is composed of output ports 202-4 and 202-5. Output port numbers in order from the left of the entry 910 correspond to hash values 1, 2, 3, and 4 described later. An asterisk "*" denotes that there is no valid setting. The control unit 830 reads the output port number table 820 by using the output port group number received from the routing table search unit 810 as an address, and determines that valid output port numbers are output port number candidates.

Methods for determining one output port number from output port number candidates can include a method for employing four hash functions $H4(x)$, $H3(x)$, $H2(x)$, and $H1(x)$, for example. $H4(x)$ outputs one integer as a hash value out of 1 to 4 with respect to argument x, $H3(x)$ outputs one integer out of 1 to 3, $H2(x)$ outputs one integer out of 1 and 2, and $H1(x)$ outputs 1. The control unit 830 selects one hash function $Hh(x)$ from the number "h" of valid output port numbers obtained by referring to the output port number table 820. For example, the control unit 830 selects hash function $H1(x)$ for output port group 2 and hash function $H2(x)$ for output port groups 1 and 3. Further, the control unit 830 calculates the value of $Hh(x)$ in which argument x is a value composed of at least one piece of information in the header part 310 stored in the header information storing unit 850. For example, argument x can include information obtained by combining SIP 311, DIP 312, SPORT 313, and DPORT 314; however, it may be other information. Lastly, the control unit 830 determines that an output port number candidate corresponding to the hash value is a final output port number and the other number is the dummy packet output port number k.

(2-2) In the Case of Controlling the Total Bandwidth of Packets Transmitted to a Fast-Reroute Protected/Backup Port In the case where the packet forwarding apparatus 200 according to this embodiment is set up in an MPLS network, the routing table search unit 810 in the route decision unit 221 manages the correspondence of an output group number and a label 318. When a label 318 is inputted, the routing table search unit 810 outputs the corresponding output group number to the control unit 830. The output group number refers to information corresponding to an information set of a fast-reroute protected port, a protected LSP that is set to the protected port, a backup port, and a backup LSP that is set to the backup port.

The control unit 830 determines a set of one output port number and one output label or a plurality of sets of output port numbers and output labels from the received output group number. Further, the control unit 830 determines one set from the plurality of sets and transmits the constituents as packet output port information 22 and packet output label information 25 to the packet receiving unit 230. Furthermore, the control unit 830 transmits an output port number and an output label constituting another set k (k=1, 2, . . . , n) (k is a positive integer not greater than n) as dummy packet output information 26-$k$ to the packet receiving unit 230.

Figure 12:
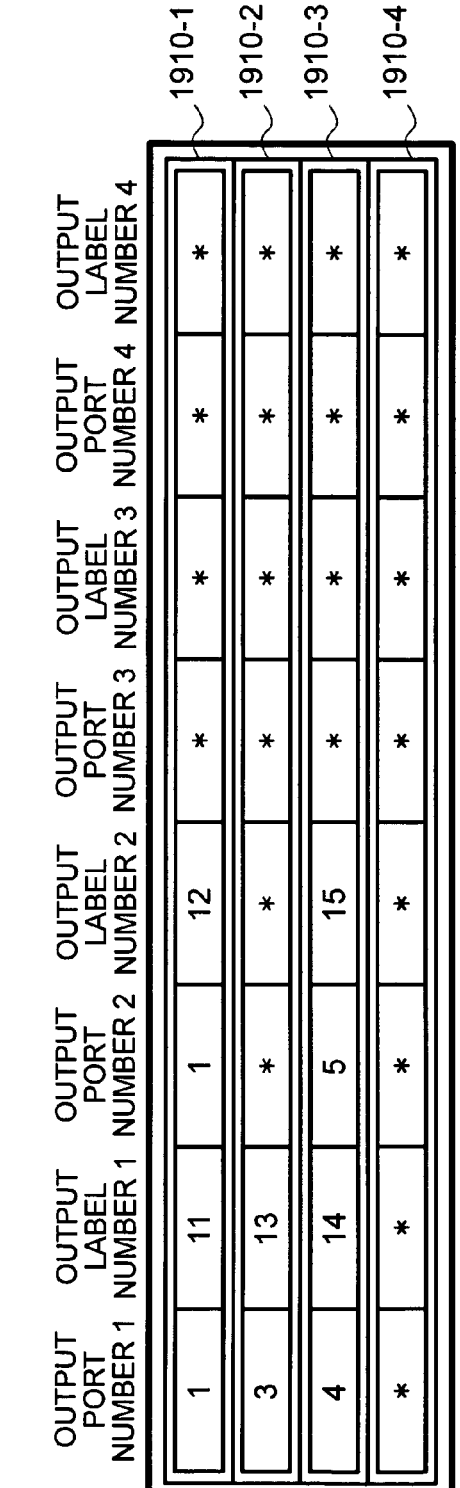
FIG. 12 is an illustration showing an example of the structure of an output port/output label number table 1920.

The control unit 830 refers to, for example, an output port/output label number table 1920 shown in FIG. 12 in place of the output port number table 820 described above and thereby determines a set of one output port number and one output label or a plurality of sets of output port numbers and output labels. The output port/output label number table 1920 contains an entry 1910 for storing four sets of output port numbers and output label numbers for each output group number. The control unit 830 can determine a set of an output port number and an output label number by reading an entry 1910 corresponding to an output group number. As a method for determining one set from these sets, hash functions can be used for selection as in the case of controlling the total bandwidth of packets outputted to a link aggregation group.

(3) Detailed Operation of the Shaping Unit 100

Figure 1:
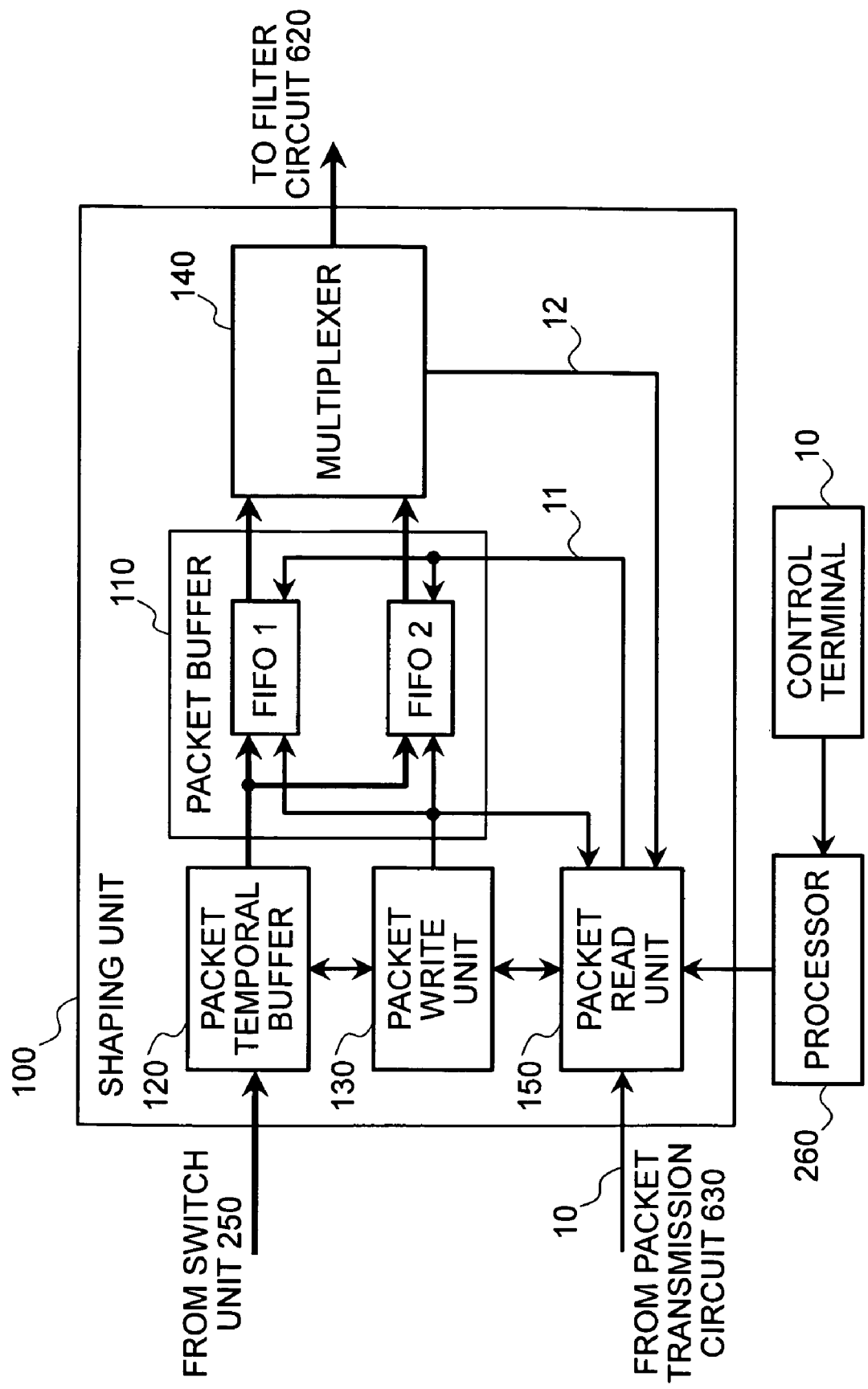
FIG. 1 is a block diagram of a shaping unit 100.

The detailed operation of the shaping unit 100 specific to the packet forwarding apparatus 200 will be described with reference to FIG. 1. The shaping unit 100 shown in FIG. 1 is composed of a packet buffer 110 including FIFO 1 for class 1 and FIFO 2 for class 2 which store packets, a packet temporal buffer 120 for temporarily storing packets to be written into the buffer 110, a packet write unit 130 for writing packets into the buffer 110, a packet read unit 150 for reading packets from the buffer 110, and a multiplexer 140 for multiplexing packets read from FIFO 1 and FIFO 2 and transmitting the multiplexed packets to a filter circuit 620.

In this embodiment, the number of classes determined by the flow detection unit 222 is two, and FIFO 1 and FIFO 2 correspond to class 1 and class 2, respectively. In the case of three or more classes, the shaping unit 100 includes more FIFOs, and the flow detection unit 222 determines three or more classes.

The processing in the shaping unit 100 includes packet write processing in which the shaping unit 100 receives a packet from the switch unit 250 and writes the packet into the buffer 110 and packet read processing in which the shaping unit 100 reads the packet from the buffer 110 and transmits it to the filter circuit 620. The packet write processing and the packet read processing will be described below.

(3-1) Packet Write Processing

Figure 13:
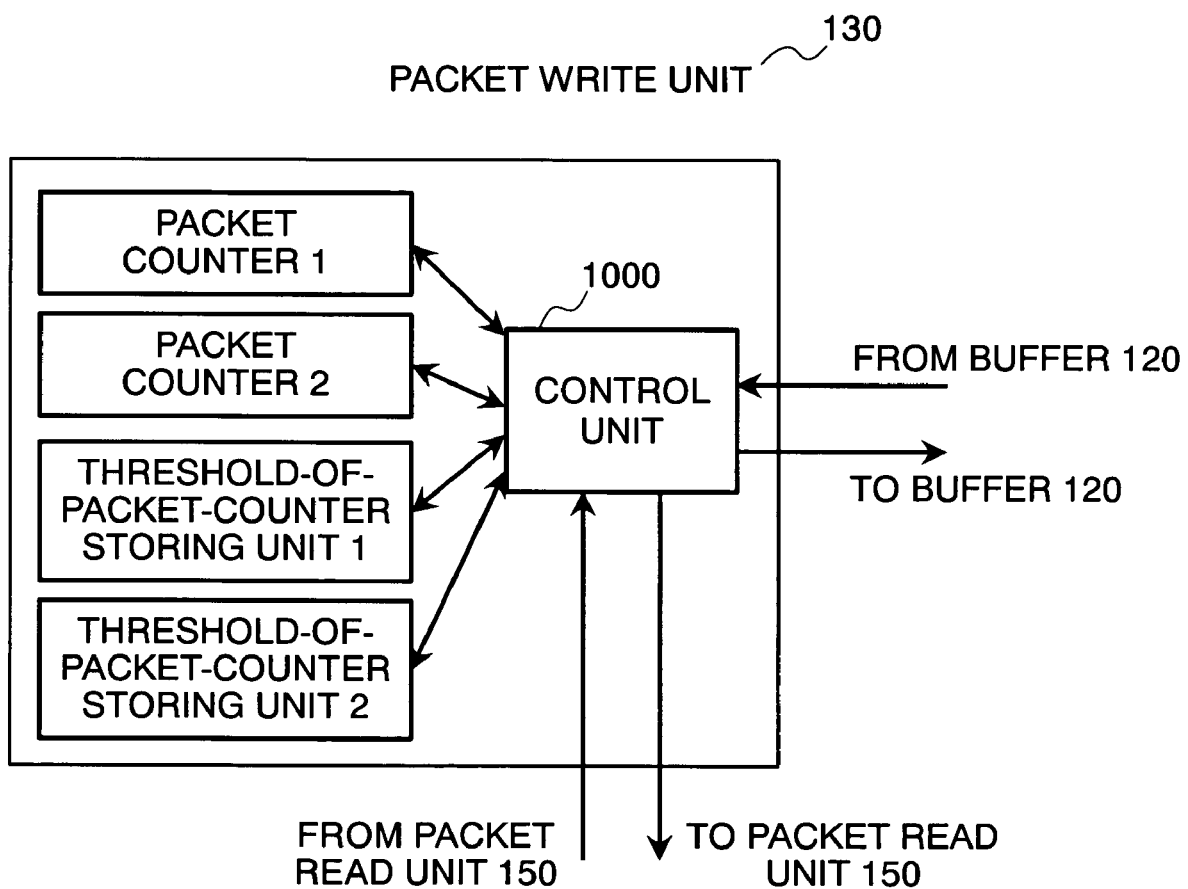
FIG. 13 is a block diagram of a packet write unit 130.

This processing is performed mainly by the packet write unit 130. Upon receiving a packet or a dummy packet from the switch unit 250, the packet temporal buffer 120 stores the packet and transmits the class 334 of the internal header part 330 to the packet write unit 130. FIG. 13 shows the details of the packet write unit 130. The packet write unit 130 is composed of packet counters 1 and 2 for counting the number of packets stored in FIFO 1 and FIFO 2, threshold-of-packet-counter storing units 1 and 2 for storing the respective thresholds, and a control unit 1000. Upon receiving the class 334 from the packet temporal buffer 120, the control unit 1000 reads a counter value in the packet counter corresponding to the class 334 and a threshold in the threshold-of-packet-counter storing unit. If the counter value is equal to or smaller than the threshold, the control unit 1000 writes a packet stored in the packet temporal buffer 120 into the FIFO corresponding to the class 334 and increments the corresponding packet counter by '1'. On the other hand, if the counter value is larger than the threshold, the control unit 1000 does not write a packet stored in the packet temporal buffer 120 into the FIFO.

In this case, the packet stored in the buffer 120 is discarded by being overwritten with the subsequent packet in the end.

Figure 14:
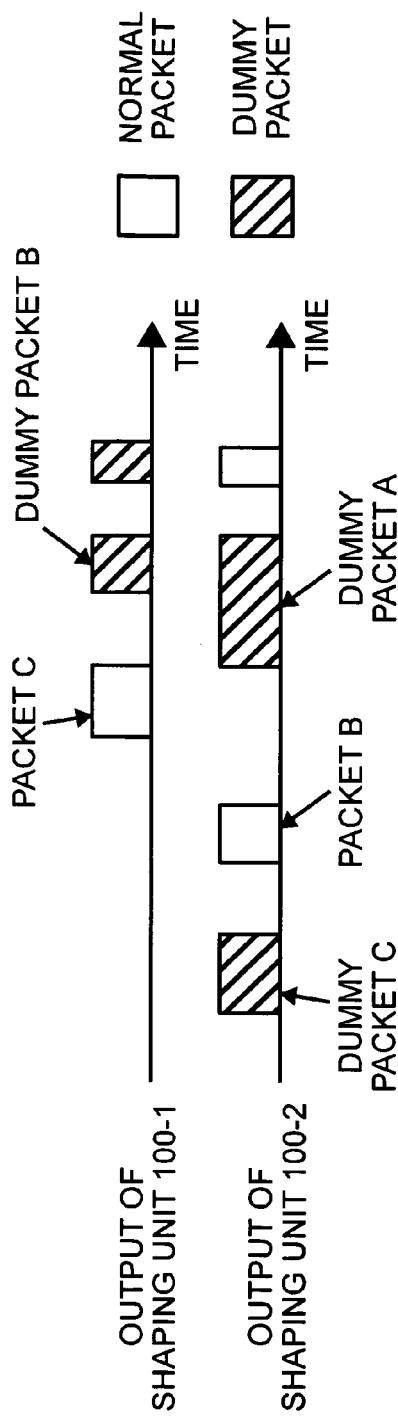
FIG. 14 is an illustration showing times when the shaping units 100-1 and 100-2 transmit packets.

In this embodiment, one packet is copied as a dummy packet, and a normal packet and a dummy packet are transmitted to the FIFOs having different output ports 202. In order for the shaping unit 100 to perform accurate bandwidth control, the thresholds for the FIFOs need to be identical. This is because it is necessary to perform the same determination about the storage or discarding of a packet and a corresponding dummy packet in FIFO. As an example of different threshold values, assume that the threshold of the threshold-of-packet-counter storing unit in the shaping unit 100-1 is smaller than that of the shaping unit 100-2 and consequently packet A in FIG. 9 received by the shaping unit 100-1 is discarded. In this case, as shown in FIG. 14, assuming that the shaping unit 100-1 outputs packet A, the shaping unit 100-2 determines the transmission time of packet B and dummy packet C, thereby negating accurate bandwidth control. If the threshold of the shaping unit 100-1 is identical to that of the shaping unit 100-2 so that packet A is stored in the shaping unit 100-1, accurate bandwidth control is achieved.

(3-2) Packet Read Processing

Figure 15:
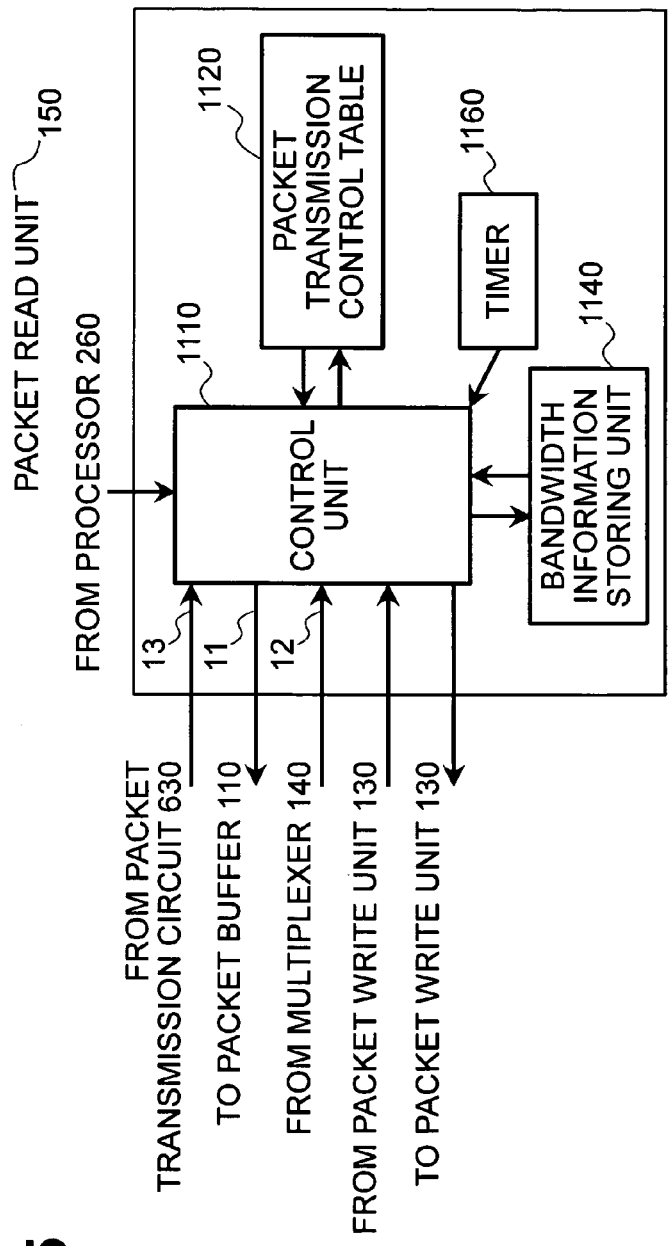
FIG. 15 is a block diagram of a packet read unit 150.
Figure 16:
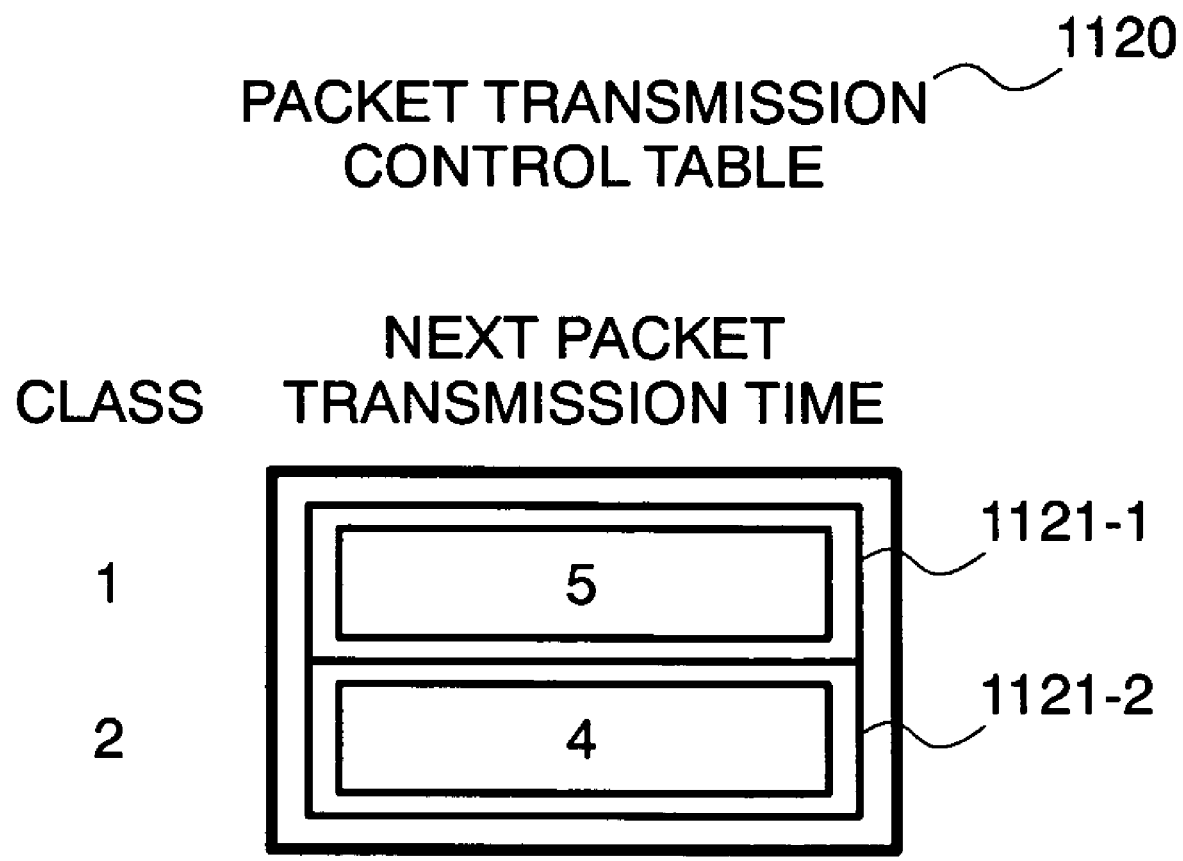
FIG. 16 is an illustration showing an example of the structure of a packet transmission control table 1120.
Figure 17:
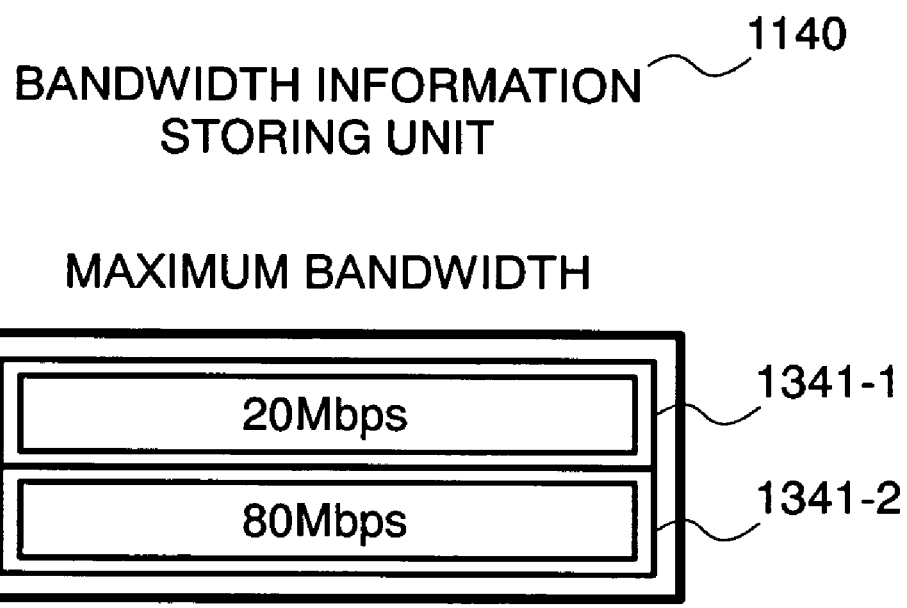
FIG. 17 is an illustration showing an example of the structure of a bandwidth information storing unit 1140.

This processing is performed mainly by the packet read unit 150. FIG. 15 shows an example of realizing the packet read unit 150. The packet read unit 150 is composed of a control unit 1110, a packet transmission control table 1120 (shown in FIG. 16) for storing the transmission time of the next packet (next packet transmission time) for each class, a bandwidth information storing unit 1140 for storing bandwidth information for each class, and a timer 1160 for storing the current time. FIG. 17 shows an example of the bandwidth information storing unit 1140 in the case of limiting the maximum bandwidths of class 1 and class 2 of an output port group to 20 Mbps and 80 Mbps respectively. The bandwidth information storing unit 1140 includes entries 1341 for setting the maximum bandwidth of each class as bandwidth information.

Figure 18:
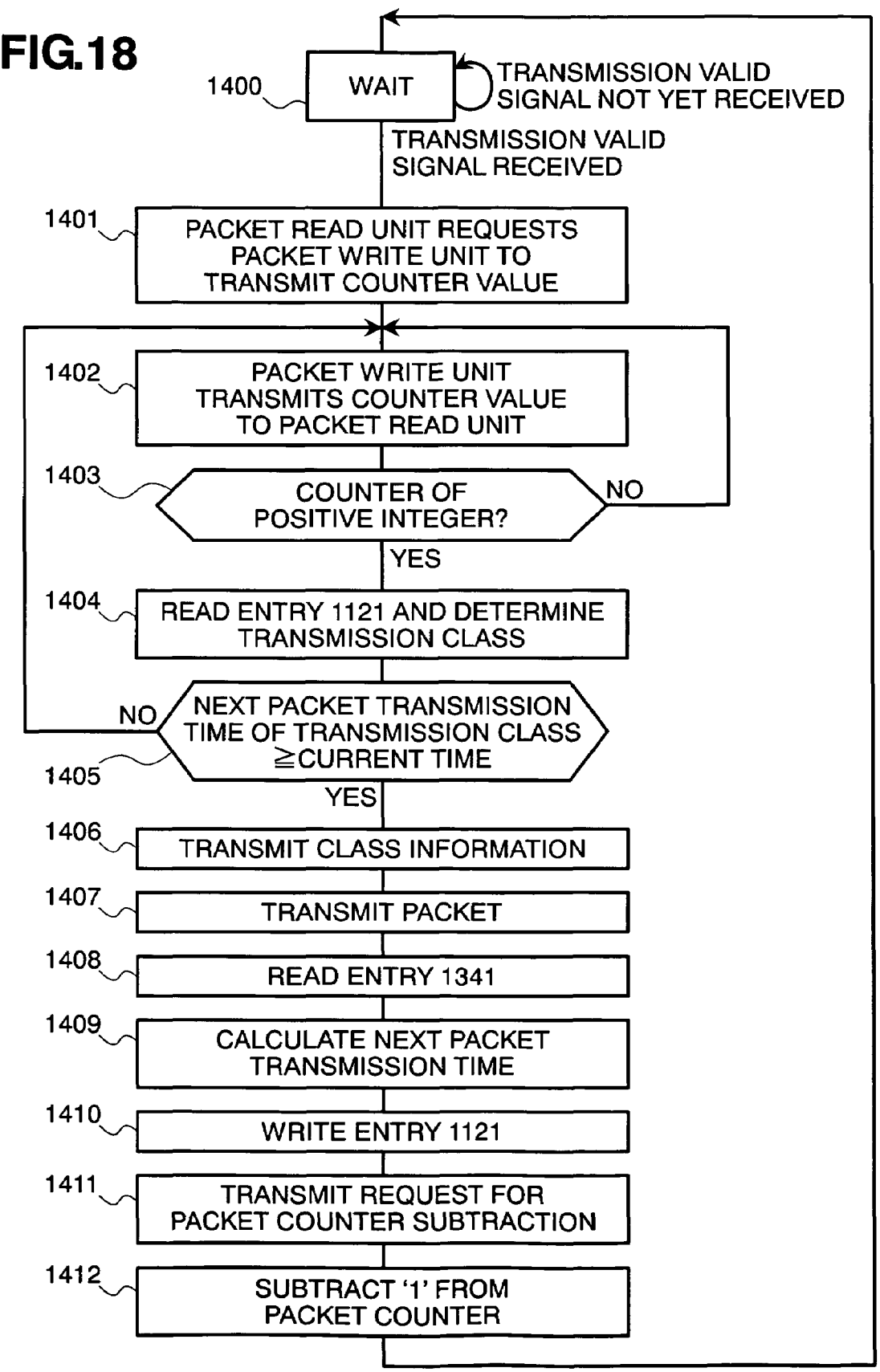
FIG. 18 is a flowchart of the packet read unit 150.
Figure 19:
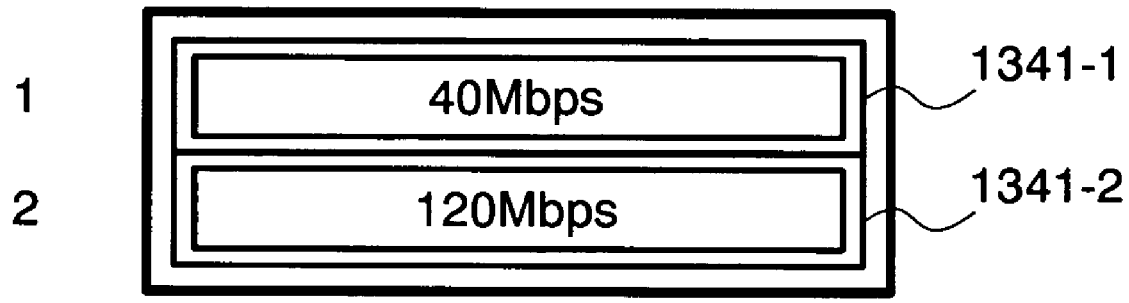
FIG. 19 is an illustration showing an example of the structure of the bandwidth information storing unit 1140.

The packet read processing will be described with reference to the flowchart of FIG. 18. This processing starts when the packet read unit 150 receives a transmission valid signal 13 transmitted by the packet transmission circuit 630 shown in FIG. 8 (step 1400). The transmission valid signal 13 is information indicating that a packet can be transmitted to the output port 202 corresponding to the packet transmission circuit 630.

Upon receiving the signal, the control unit 1110 makes a request of the packet write unit 130 to transmit values stored in the packet counters 1 and 2 (step 1401). The control unit 1000 in the packet write unit 130 that has received this request transmits the values stored in the packet counters 1 and 2 to the packet read unit 150 (step 1402).

The control unit 1110 in the packet read unit 150 detects the presence or absence of a counter storing a positive integer and determines the class of a stored packet (step 1403). If the determination result indicates "presence", the control unit 1110 reads the entries 1121 in the packet transmission control table 1120 corresponding to the classes of "presence" and determines that the class whose next packet transmission time is the earliest (next packet transmission time is the smallest) is a "transmission class" (step 1404). For example, in the case of the next packet transmission times as shown in FIG. 16, if both classes 1 and 2 are of "presence", the control unit 1110 determines that class 2 whose next packet transmission time is the earliest is a "transmission class". If either class 1 or 2 is of "presence", the control unit 1110 determines that the class of "presence" is a "transmission class". If both classes 1 and 2 are of "absence", the control unit 1110 waits until either counter value changes from zero to a positive integer by the above-described packet write processing. This waiting is implemented by the re-execution of steps 1402 and 1403 by the shaping unit 100.

Then, the control unit 1110 compares the current time indicated by the timer 1160 and the next packet transmission time of the transmission class (step 1405). If the next packet transmission time is equal to or greater than the current time (i.e., the next packet transmission time is the current time or a past time), the control unit 1110 notifies the determined transmission class as packet transmission class information 11 to the packet buffer 110 (step 1406). The FIFO corresponding to the packet transmission class information 11 reads the first packet (i.e., the earliest arrived packet out of the stored packets) and transmits it to the multiplexer 140. The multiplexer 140 transmits the packet to be sent to the output port 202 to the filter circuit 620 while transmitting the packet length 331 in the internal header part 330 as transmission packet length information 12 to the packet read unit 150 (step 1407).

On the other hand, if the next packet transmission time is smaller than the current time (i.e., the next packet transmission time is a future time), it is necessary to wait until the next packet transmission time. During this waiting period, there are cases where a packet is stored in the FIFO so that the value of the packet counter 1 or 2 changes from zero to a positive integer by the packet write processing. At this time, there is a possibility that a "transmission class" whose next packet transmission time is the earliest changes. For example, assume that the values of the packet counters 1 and 2 are 3 and 0 respectively and the values stored in the packet transmission control table 1120 are the values shown in FIG. 16. The value of the timer 1160 is 2, and the control unit 1110 waits for the packet output of class 1. At this time, if a packet of class 2 is inputted, class 2 whose next packet transmission time is earlier becomes a transmission class.

In order to deal with such a case, if the next packet transmission time is smaller than the current time, the control unit 1110 again makes a request of the packet write unit 130 to transmit the counter values (step 1402), detects the presence or absence of a counter value of a positive integer (step 1403), and determines a transmission class (step 1404).

After the next packet transmission time passes in the loop from step 1402 to step 1405 and step 1406 (transmission of class information) is completed, as described above the FIFO corresponding to the packet transmission class information 11 reads the first packet and transmits it to the multiplexer 140. The multiplexer 140 transmits the packet to the filter circuit 620 while transmitting the packet length 331 in the internal header part 330 as transmission packet length information 12 to the packet read unit 150 (step 1407).

After the packet is transmitted at step 1407, the control unit 1110 reads the entry 1341 corresponding to the transmission class from the bandwidth information storing unit 1140 (step 1408), and calculates the next packet transmission time determined by the read maximum bandwidth and the packet length (byte) in the transmission packet length information 12 transmitted by the multiplexer 140 at step 1407 (step 1409). The next packet transmission time is calculated according to the following equation.

Next packet transmission time=current time+packet length(byte)×8/maximum bandwidth (bit/second)  (1)

After the calculation, the control unit 1110 writes a new next packet transmission time into the packet transmission control table 1120 (step 1410). Lastly, the control unit 1110 makes a request of the packet write unit 130 to perform subtraction on the packet counter in the packet write unit 130 corresponding to the transmission class (step 1411), the control unit 1000 in the packet write unit 130 subtracts '1' from the value of the packet counter (step 1412).

As described above, the packet read unit 150 in the shaping unit 100 according to this embodiment calculates a next packet transmission time for each class based on a maximum bandwidth stored in the bandwidth information storing unit 1140. Only when the next packet transmission time is the current or a past time, a packet of each class is transmitted. Thereby, the shaping unit 100 achieves transmission of a packet and a dummy packet conforming to the maximum bandwidth. Assuming that the number of output ports 202 constituting an output port group is m, the bandwidth of packets transmitted by all shaping units 100 comes to a maximum bandwidth times m, at the maximum. However, the dummy packets corresponding to one packet that are sent to m−1 ports are all discarded by the filter circuits 620; therefore, the packet forwarding apparatus 200 according to this embodiment can control the bandwidth of the finally transmitted packet to the maximum bandwidth or less.

While the embodiment has been described with reference to the case where the bandwidth information is the maximum bandwidth of each class, it may be any other bandwidth information. For example, it can include the bandwidth information that is the minimum bandwidth of each class and used for transmitting packets with the minimum bandwidth of each class ensured and also transmitting packets over the minimum bandwidth when there is a surplus bandwidth in the total bandwidth of each output port group. The total bandwidth refers to the total sum of physical bandwidths of output ports constituting an output port group. For example, in the case where a link aggregation group is composed of output ports 202-1 and 202-2 of Fast Ethernet (a physical bandwidth of 100 Mbps) (Ethernet is a registered trademark), the total bandwidth comes to 200 Mbps (=100 Mbps×2 ports). A surplus bandwidth in the total bandwidth occurs in the case where the total sum of the maximum bandwidths of classes is smaller than the total bandwidth or there is no packet output for the maximum bandwidth of a special class due to no input of packets of this class.

The bandwidth information storing unit 1140 in the shaping unit 100 that ensures a minimum bandwidth stores a minimum bandwidth instead of a maximum bandwidth in an entry 1341. In the setting values shown in FIG. 19, the minimum bandwidths of classes 1 and 2 are 40 Mbps and 120 Mbps respectively. The shaping unit 100 calculates a next packet transmission time at step 1409, according to the following equation (2).

$$\text{Next packet transmission time} = \text{current time} + \text{packet length(byte)} \times 8 / \text{minimum bandwidth (bit/second)} \quad (2)$$

Further, in order that a surplus bandwidth is allocated to each class, at step 1405 the process goes to step 1406, regardless of the value of the next packet transmission time. Owing to the change of step 1405, a surplus bandwidth is allocated based on the ratio between the minimum bandwidths of classes. For example, assume that a link aggregation group is composed of output ports 202-1 and 202-2 each having a bandwidth of 100 Mbps and the bandwidths of classes 1 and 2 in the link aggregation group are the values shown in FIG. 19.

In the case where packets of classes 1 and 2 each having a bandwidth of 150 Mbps are inputted into the packet forwarding apparatus 200 of this embodiment, the surplus bandwidth of the link aggregation group comes to 400 Mbps (=200 Mbps−(40 Mbps+120 Mbps)). The surplus bandwidth is allocated to the classes at the ratio between the respective minimum bandwidths. The respective bandwidths of the classes come to 50 Mbps (=40 Mbps+40 Mbps×40 Mbps/(40 Mbps+120 Mbps)) and 150 Mbps (=120 Mbps+40 Mbps×120 Mbps/(40 Mbps+120 Mbps)).

Further, it is possible that the packet forwarding apparatus 200 of this embodiment achieves Weighted Fair Queuing (WFQ) for allocating the total bandwidth of output ports 202 of each output port group based on each class weight W. As described above, the packet forwarding apparatus 200 of this embodiment allocates the total bandwidth of the output ports constituting the link aggregation group at the ratio between the minimum bandwidths. Therefore, if an arbitrary bandwidth in proportion to each class weight W as a minimum bandwidth is set in the bandwidth information storing unit 1140, the shaping unit 100 can achieve WFQ.

(4) An Embodiment Employing a Bandwidth Policing Unit in Place of the Shaping Unit The description has been made of an embodiment of the shaping unit 100 having the buffer for storing packets. In the case of limiting the total bandwidth for an output port group to a maximum bandwidth, the packet forwarding apparatus 200 may include a bandwidth policing unit 2000 shown in FIG. 20 in place of the shaping unit 100. The entire set of the shaping unit 100 and the bandwidth policing unit 2000 is also referred to as a bandwidth control unit for controlling a bandwidth.

All bandwidth policing units 2000 corresponding to output ports constituting an output port group control the total bandwidth of a dummy packet and a normal packet to a maximum bandwidth or less, on the assumption that the packet length of the dummy packet is the packet length 331 in the packet. For example, in the case of limiting the total bandwidth of packets transmitted to a link aggregation group and a protected/backup port to a maximum bandwidth of A Mbps, the bandwidth policing unit 2000 limits the total bandwidth of a dummy packet and a normal packet to A Mbps. However, in practice, the packet length of a dummy packet is shorter than the packet length 331 in the packet; therefore, an actual bandwidth is less than A Mbps.

Figure 20:
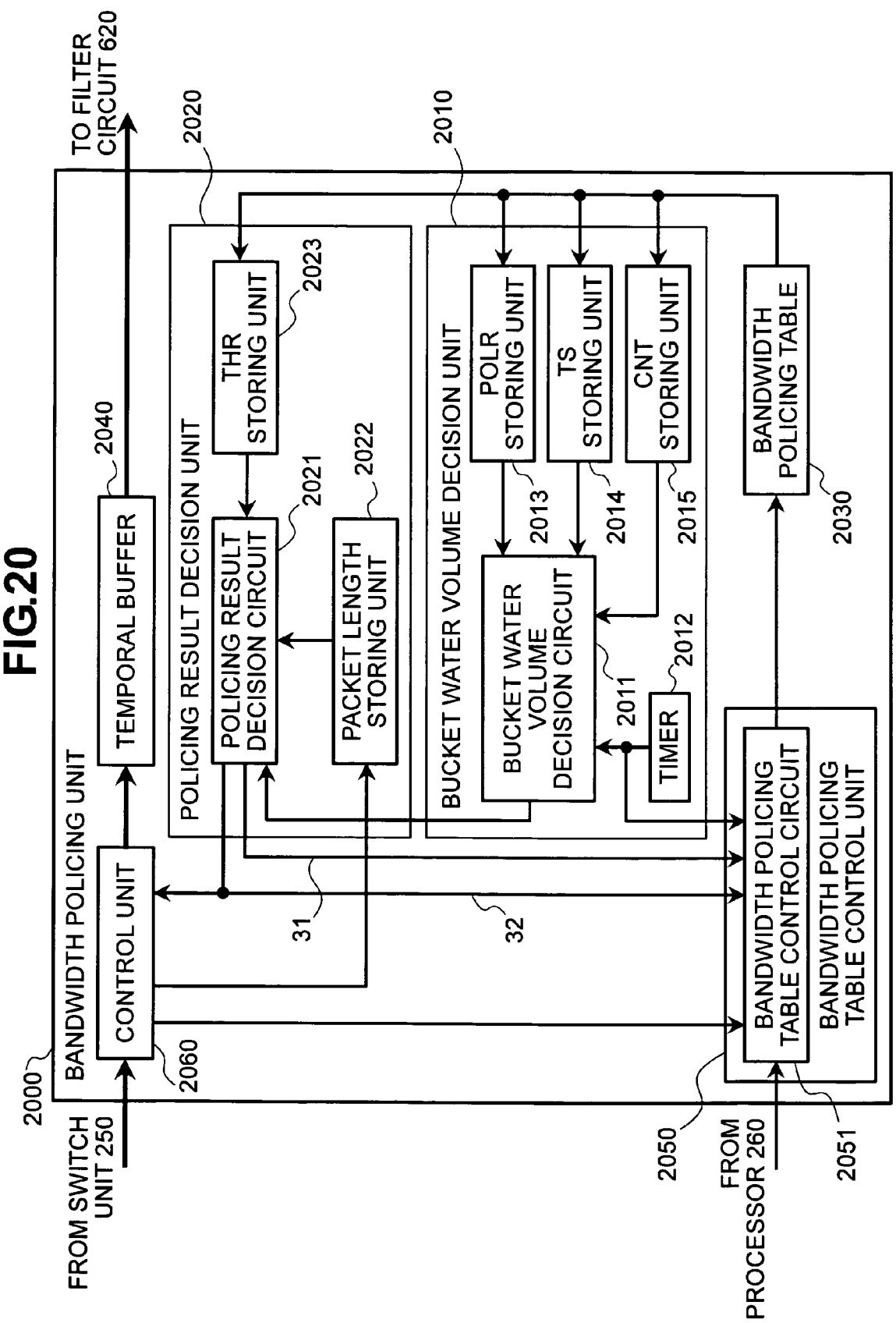
FIG. 20 is a block diagram of a bandwidth policing unit 2000.
Figure 21:
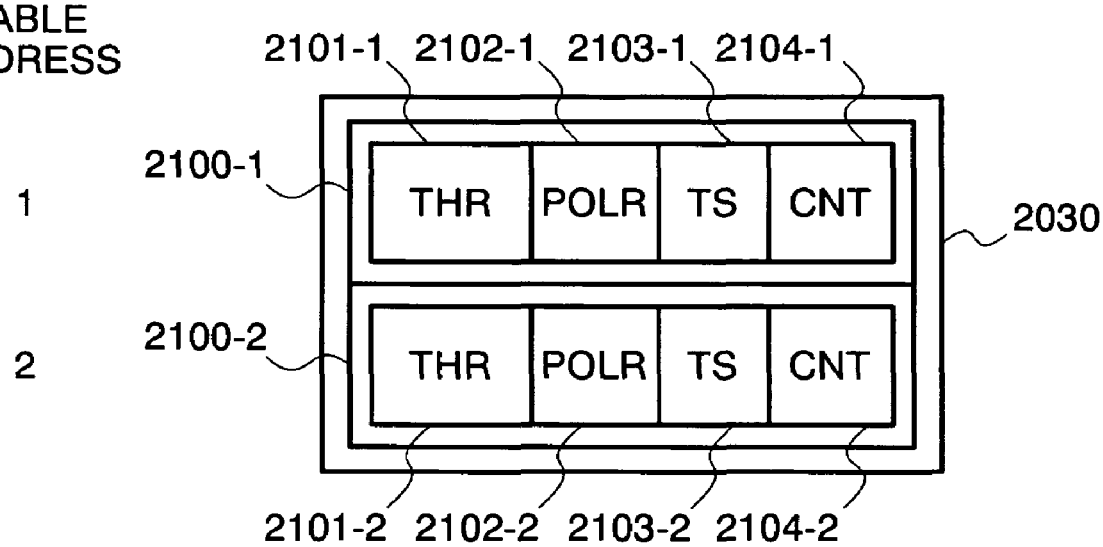
FIG. 21 is an illustration showing an example of a bandwidth policing table 2030.

The detailed operation of the bandwidth policing unit 2000 will be described below with reference to FIGS. 20 to 22. As a bandwidth policing algorithm of the bandwidth policing unit 2000, such a modified algorithm is used that a continuous-state Leaky Bucket Algorithm for policing cells of fixed-length packets is expanded in order to police a bandwidth of variable length packets. The Leaky Bucket Algorithm is a model of certain depth of leakage bucket with a hole. While the bucket is storing water therein, water leaks at a predetermined rate corresponding to a policing bandwidth, and the amount of water corresponding to one cell is poured into the bucket upon arrival of a cell. The bucket has a depth for the purpose of allowing fluctuations of cell arrival. When the water is not overflowing the bucket, it is determined that the input cell is conformant. If the water overflows the bucket, it is determined that the input cell is non-conformant. In this embodiment, the policing of the bandwidth for variable length packets is achieved by varying the amount of water to be poured into the bucket depending upon an arrival packet.

The bandwidth policing unit 2000 which performs bandwidth policing according to this algorithm is composed of a bandwidth policing table control unit 2050, a bucket water volume decision unit 2010, a policing result decision unit 2020, a bandwidth policing table 2030, a temporal buffer 2040, and a control unit 2060. FIG. 21 shows a format of the bandwidth policing table 2030. The bandwidth policing table 2030 contains bandwidth policing control information 2100-$k$ (where k=1 and 2) for each class. The bandwidth policing unit 2000 performs bandwidth policing for one class by using one piece of bandwidth policing control information 2100-$k$. The bandwidth policing control information 2100-$k$ contains a threshold (THR) 2101-$k$ (byte) which corresponds to the volume of a bucket; a policing rate (POLR) 2102-$k$ (byte/sec) which corresponds to the leakage rate of the bucket, i.e., a maximum bandwidth; a time stamp (TS) 2103-$k$ (sec) indicative of a time when water corresponding to an arrival packet was last poured into the bucket; and a count (CNT) 2104-$k$ (byte) which corresponds to the amount of water stored in the bucket. Since the TS 2103-$k$ and CNT 2104-$k$ represent the arrival history of packets that have recently arrived in the bandwidth policing unit 2000, they may be referred to as packet arrival history information.

Figure 22:
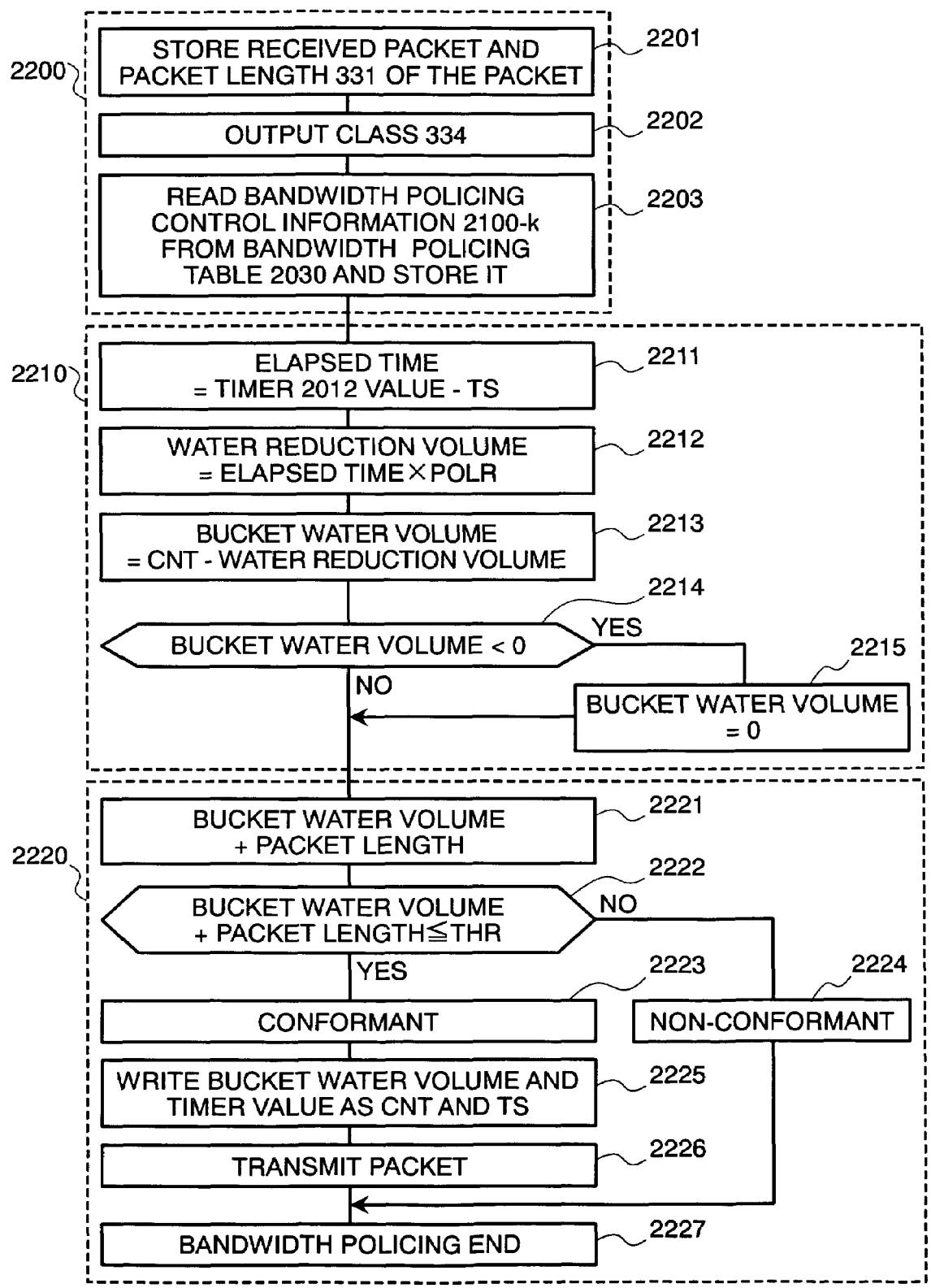
FIG. 22 is a flowchart of the bandwidth policing unit 2000.

FIG. 22 shows a flowchart of the bandwidth policing unit 2000. Processing performed in the bandwidth policing unit 2000 includes bandwidth policing start processing 2200, bucket water volume decision processing 2210, and policing result decision processing 2220. The latter two kinds of processing are primarily carried out by the bucket water volume decision unit 2010 and the policing result decision unit 2020 respectively.

When the control unit 2060 in the bandwidth policing unit 2000 receives a packet or a dummy packet, it stores the packet into the temporal buffer 2040. Further, the control unit 2060 stores a packet length 331 into a packet length storing unit 2022 in the policing result decision unit 2020 (step 2201). Then, the control unit 2060 transmits a class 334 to a bandwidth policing table control circuit 2051 in the bandwidth policing table control unit 2050 (step 2202).

Upon receiving the class 334, the bandwidth policing table control circuit 2051 reads bandwidth policing control information 2100-$k$ by using the value of the class 334 as an address for accessing the bandwidth policing table 2030 and stores THR 2101 into a THR storing unit 2023 in the policing result decision unit 2020 and POLR 2102-$k$, TS 2103-$k$, and CNT 2104-$k$ into a POLR storing unit 2013, a TS storing unit 2014, and a CNT storing unit 2015 in the bucket water volume decision unit 2010, respectively (step 2203).

In the bucket water volume decision processing 2210, the bucket water volume decision unit 2010 determines the amount of water in a bucket (bucket water volume) immediately before the input of each packet. First, a bucket water volume decision circuit 2011 calculates the differences between the value (sec) of a timer 2012 for counting the current time and TS 2103-$k$ (sec) in the TS storing unit 2014 to determine time (sec) elapsed after water was last poured into the bucket (step 2211). Then, the bucket water volume decision circuit 2011 multiplies the elapsed time (sec) by POLR 2012-$k$ (byte/sec) in the POLR storing unit 2013 to calculate the amount of water (water reduction volume) that has leaked out after water was last poured into the bucket (step 2212). Further, the bucket water volume decision circuit 2011 subtracts the water reduction volume from CNT 2104-$k$ in the CNT storing unit 2015 to determine a bucket water volume immediately before the input of a packet (step 2213). The bucket water volume decision circuit 2011 determines whether the bucket water volume is positive or negative (step 2214). If the bucket water volume is negative, the bucket water volume decision circuit 2011 corrects the bucket water volume to "0" which means that the bucket is empty (step 2215).

In the policing result decision processing 2220, a policing result decision circuit 2021 in the policing result decision unit 2020 determines whether water equivalent to a packet in the temporal buffer 2040 can be poured into the bucket. First, the policing result decision circuit 2021 adds a packet length (byte) to the bucket water volume (byte) determined in the bucket water volume decision processing 2210 (step 2221). The policing result decision circuit 2021 compares the volume of the bucket THR 2101-$k$ stored in the THR storing unit 2023 with the above added value (step 2222). If the added value (bucket water volume+packet length) is larger than THR 2101-$k$, that is, water overflows the bucket, the policing result decision circuit 2021 determines that the packet or the dummy packet stored in the temporal buffer 2040 is a non-conformant packet and transmits bandwidth policing result information 31 indicative of "non-conformance" to the bandwidth policing table control circuit 2051 in the bandwidth policing table control unit 2051 (step 2224). On the other hand, if the added value (bucket water volume+packet length) is equal to or smaller than THR 2101-$k$, the policing result decision circuit 2021 determines that the input packet is a conformant packet, transmits bandwidth policing result information 31 indicative of "conformance" to the bandwidth policing table control circuit 2051 and the control unit 2060, and transmits the added value (bucket water volume+packet length) as bucket water volume information 32 to the bandwidth policing table control circuit 2051 (step 2223). Since it can also be said that the policing result decision unit 2020 determines whether or not to transfer packets to the subsequent filter circuit 620, it may be referred to as a transfer decision unit.

Upon receiving the bandwidth policing result information 31 indicative of "conformance", the bandwidth policing table control circuit 2051 writes the bucket water volume information 32 and the timer 2012 into their corresponding CNT 2104-$k$ and TS 2103-$k$ in the bandwidth policing table 2030 as a bucket water volume immediately after the bandwidth policing and a packet arrival time, respectively (step 2225). The control unit 2060 transmits the packet or the dummy packet stored in the temporal buffer 2040 to the filter circuit 620 (step 2226). The bandwidth policing table control circuit 2051 does not execute steps 2225 and 2226 when it receives the bandwidth policing result information 31 indicative of "non-conformance". In this case, the packet stored in the temporal buffer 2040 is discarded by being overwritten with the subsequent packet in the end. When the above processing has been finished, the bandwidth policing terminates (step 2227).

As described above, the bandwidth policing unit 2000 according to this embodiment determines that a packet exceeding a maximum bandwidth is a non-conformant packet and discards it, thereby achieving transmission of a packet and a dummy packet conforming to a maximum bandwidth set to each class. Assuming that the number of output ports 202 constituting an output port group is m, the bandwidth of packets transmitted by all shaping units 100 comes to a maximum bandwidth times m, at the maximum. However, the dummy packets corresponding to one packet that are sent to m−1 ports are all discarded by the filter circuits 620; therefore, the packet forwarding apparatus 200 according to this embodiment can control the bandwidth of the finally transmitted packet to the maximum bandwidth or less.

(5) Mounting of the Shaping Unit

It is desirable that the shaping units 100 corresponding to the output ports 202 constituting an output port group be mounted on separate printed circuit boards. This is because a small possibility that the failure of a component on a printed circuit board affects the other printed circuit boards can prevent the concurrent break in communication of the output ports 202 constituting an output port group.

In the case where individual shaping units 100 are mounted on separate printed circuit boards and the shaping units 100 need to transmit and receive information between themselves, delay time of information transfer increases so that it becomes difficult for the shaping units 100 to perform high-speed bandwidth control.

However, as described above, in the shaping units 100 corresponding to the output ports 202 constituting a link aggregation group and a protected/backup port, an individual shaping unit 100 can operate without transferring information between shaping units 100. Therefore, the packet forwarding apparatus 200 according to this embodiment can perform high-speed bandwidth control, avoiding the above problem.

Further, in the case of mounting the bandwidth policing units 2000 in place of the shaping units 100, it is desirable that the output ports 202 constituting an output port group and the corresponding bandwidth policing units 2000 be mounted on separate printed circuit boards. As in the case of the shaping units 100, an individual policing unit 2000 can operate without transferring information between policing units 2000. Therefore, the packet forwarding apparatus 200 according to this embodiment can perform high-speed bandwidth control, avoiding the above problem.

Further, it can be considered that they are mounted in separate apparatuses instead of separate printed circuit boards in one apparatus.

(6) Method of Setting Up the Bandwidth Information Storing Unit

Figure 23:
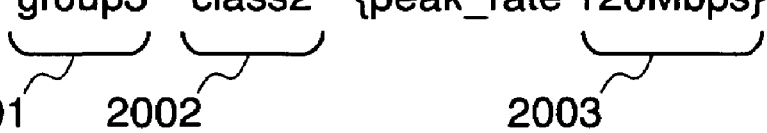
FIG. 23 is an illustration showing an example of the commands for setting up the bandwidth information storing unit 1140.

A description will be made on a method of setting up the bandwidth information storing unit 1140 in the packet read unit 150. An administrator of the packet forwarding apparatus 200 sets up the bandwidth information storing unit 1140 using a control terminal 10. FIG. 23 shows an example of the commands inputted into the control terminal 10 at this time. The command "shaper" is a command for limiting the total bandwidth of each class of an output port group to the maximum bandwidth. Output port groups are described in field 2001; classes, field 2002; and maximum bandwidths, field 2003. For example, the command of the first line is a command for limiting the bandwidth of class 1 of group 1 which is an output port group to a maximum bandwidth of 20 Mbps.

Upon receiving a command, the processor 260 transmits fields 2002 and 2003 information and a request to write this information to the shaping units 100 of all output ports 202 constituting the output port group of field 2001. Upon receiving this information, the control unit 1110 in the packet read unit 150 writes a value of field 2003 into an entry 1341 shown in FIG. 17 corresponding to a class of field 2002. Further, the value of a minimum bandwidth can be set by substituting "minimum_rate" for "peak_rate" in a command.

Figure 24:
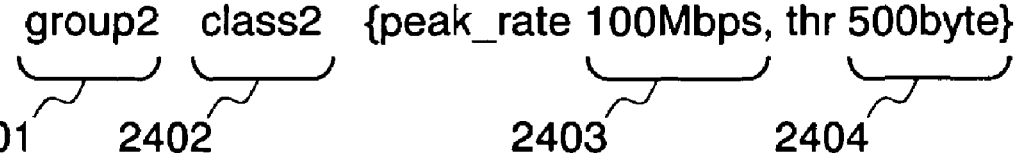
FIG. 24 is an illustration showing an example of the commands for setting up the bandwidth policing table 2030.

A description will be made on a method of setting up the bandwidth policing table 2030 in the bandwidth policing unit 2000. FIG. 24 shows an example of the commands inputted into the control terminal 10 at this time. The command "policer" is a command for limiting the total bandwidth of each class of an output port group to the maximum bandwidth. Output port groups are described in field 2401; classes, field 2402; maximum bandwidths, field 2403; and information corresponding to THR 2101, field 2404. For example, the command of the first line is a command for limiting the bandwidth of class 1 of group 1 which is an output port group to a maximum bandwidth of 20 Mbps, and THR is 100 byte. Upon receiving a command, the processor 260 transmits fields 2402, 2403 and 2404 information and a request to write this information to the bandwidth policing unit 2000 of all output ports 202 constituting the output port group of field 2401. Upon receiving this information, the bandwidth policing table control circuit 2051 writes values of fields 2404 and 2403 into THR 2101 and POLR 2102 of an entry 2100 shown in FIG. 21 corresponding to a class of field 2402.

The processor 260 may be referred to as a setting control unit. It is possible to control the total bandwidth of packets outputted to a plurality of ports by having the above-described units.

The foregoing invention has been described in terms of preferred embodiments. However, those skilled, in the art will recognize that many variations of such embodiments exist. Such variations are intended to be within the scope of the present invention and the appended claims.

The invention claimed is:

1. A packet forwarding apparatus for determining a plurality of input ports, a plurality of output ports, and an output port group composed of at least one output port from information in a header of a packet and transmitting a packet from either of a first output port and a second output port included in the output port group, the packet forwarding apparatus comprising:

a transmission control unit for controlling a bandwidth of the second output port included in the output port group, using a packet length of a first packet that is transmitted from the first output port included in the output port group, further comprising a packet receiving unit for creating a dummy packet for storing information indicating the packet length of the first packet and transmitting the dummy packet to the transmission control unit, and wherein the transmission control unit includes a filter unit for discarding the dummy packet.

2. A packet forwarding apparatus for receiving a packet from a plurality of input ports and transmitting a packet from a plurality of output ports, the packet forwarding apparatus comprising:

a route decision unit for determining a transfer destination of a received packet, based on header information of the received packet; and a receiving unit for, if the route decision unit determines that a first output port out of an output port group composed of a plurality of output ports is a transfer destination of a first packet, transferring the first packet to a first transmission unit corresponding to the first output port and transmitting a notification of a packet length of the first packet to a second transmission unit corresponding to a second output port other than the first output port out of the output port group, wherein the receiving unit transmits the notification of the packet length, using a dummy packet containing information indicating the packet length, and wherein the bandwidth control unit includes a queue for storing a packet and a dummy packet received from the receiving unit, and a packet write unit for counting the number of packets and dummy packets to be written into the queue, comparing the counted number of packets and dummy packets with a threshold, and discarding the packets and dummy packets to be written if the counted number of packets and dummy packets exceeds the threshold.

3. A packet forwarding apparatus for receiving a packet from a plurality of input ports and transmitting a packet from a plurality of output ports, the packet forwarding apparatus comprising:

a route decision unit for determining a transfer destination of a received packet, based on header information of the received packet; and a receiving unit for, if the route decision unit determines that a first output port out of an output port group composed of a plurality of output ports is a transfer destination of a first packet, transferring the first packet to a first transmission unit corresponding to the first output port and transmitting a notification of a packet length of the first packet to a second transmission unit corresponding to a second output port other than the first output port out of the output port group, wherein the receiving unit transmits the notification of the packet length, using a dummy packet containing information indicating the packet length, wherein the bandwidth control unit includes a queue for storing a packet and a dummy packet received from the receiving unit, and a packet read unit for determining a timing for reading a packet and a dummy packet from the queue, based on information indicating a packet length stored in the packet and the dummy packet and a set bandwidth.

4. A packet forwarding apparatus for receiving a packet from a plurality of input ports and transmitting a packet from a plurality of output ports, the packet forwarding apparatus comprising:

a route decision unit for determining a transfer destination of a received packet, based on header information of the received packet; and a receiving unit for, if the route decision unit determines that a first output port out of an output port group composed of a plurality of output ports is a transfer destination of a first packet, transferring the first packet to a first transmission unit corresponding to the first output port and transmitting a notification of a packet length of the first packet to a second transmission unit corresponding to a second output port other than the first output port out of the output port group, wherein the receiving unit transmits the notification of the packet length, using a dummy packet containing information indicating the packet length, and wherein the bandwidth control unit includes a storage unit for storing a packet and a dummy packet received from the receiving unit, a packet arrival history storing unit for storing packet arrival history information corresponding to a packet length of a packet and a dummy packet last stored in the storage unit, and a transfer decision unit for, at the time of receiving a packet or a dummy packet from the receiving unit, determining whether or not to transfer the received packet or dummy packet, based on a packet length contained in the packet or the dummy packet, packet arrival history information stored in the packet arrival history storing unit, and a set bandwidth.

5. A packet forwarding apparatus for receiving a packet from a plurality of input ports and transmitting a packet from a plurality of output ports, the packet forwarding apparatus comprising:

a route decision unit for determining a transfer destination of a received packet, based on header information of the received packet; and a receiving unit for, if the route decision unit determines that a first output port out of an output port groan composed of a plurality of output ports is a transfer destination of a first packet, transferring the first packet to a first transmission unit corresponding to the first output port and transmitting a notification of a packet length of the first packet to a second transmission unit corresponding to a second output port other than the first output port out of the output port group, further comprising:

a setting control unit for, upon receiving an input for setting a bandwidth, storing the bandwidth into the first and second transmission units, and a bandwidth control unit for controlling a packet transmitted at the second transmission unit and the packet length notified to the second transmission unit from the receiving unit, based on the bandwidth stored by the setting control unit.

* * * * *